US010600150B2

(12) United States Patent
Kim et al.

(10) Patent No.: US 10,600,150 B2
(45) Date of Patent: Mar. 24, 2020

(54) UTILIZING AN INERTIAL MEASUREMENT DEVICE TO ADJUST ORIENTATION OF PANORAMA DIGITAL IMAGES

(71) Applicant: Adobe Inc., San Jose, CA (US)

(72) Inventors: Byungmoon Kim, Sunnyvale, CA (US); Joon-Young Lee, San Jose, CA (US); Jinwoong Jung, Pohang (KR); Gavin Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 580 days.

(21) Appl. No.: 15/339,017

(22) Filed: Oct. 31, 2016

(65) Prior Publication Data

US 2018/0122042 A1    May 3, 2018

(51) Int. Cl.
| G06T 3/00 | (2006.01) |
| H04N 5/232 | (2006.01) |
| G06F 3/0346 | (2013.01) |
| G06F 3/01 | (2006.01) |
| H04N 5/262 | (2006.01) |

(52) U.S. Cl.
CPC ............ *G06T 3/0062* (2013.01); *G06F 3/011* (2013.01); *G06F 3/0346* (2013.01); *H04N 5/23238* (2013.01); *H04N 5/2628* (2013.01)

(58) Field of Classification Search
CPC ...... G06T 3/0062; G06F 3/011; G06F 3/0346; H04N 5/23238; H04N 5/2628
See application file for complete search history.

(56) References Cited

U.S. PATENT DOCUMENTS

| 6,466,198 B1 * | 10/2002 | Feinstein | G06F 1/1626 |
| | | | 345/158 |
| 9,087,401 B1 * | 7/2015 | Zheng | G06T 19/006 |
| 9,277,122 B1 * | 3/2016 | Imura | G06T 7/73 |
| 9,779,517 B2 * | 10/2017 | Ballard | G06T 11/00 |
| 2012/0054478 A1 * | 3/2012 | Curtis | G09G 3/20 |
| | | | 713/2 |
| 2013/0219345 A1 * | 8/2013 | Saukko | G06F 1/1626 |
| | | | 715/863 |
| 2017/0186219 A1 * | 6/2017 | Xu | G06T 15/20 |

* cited by examiner

*Primary Examiner* — Mishawn N. Hunter
(74) *Attorney, Agent, or Firm* — Keller Jolley Preece

(57) ABSTRACT

The present disclosure includes methods and systems for modifying orientation of a spherical panorama digital image based on an inertial measurement device. In particular, one or more embodiments of the disclosed systems and methods correct for tilt and/or roll in a digital camera utilized to capture a spherical panorama digital images by detecting changes in orientation to an inertial measurement device and generating an enhanced spherical panorama digital image based on the detect changes. In particular, in one or more embodiments, the disclosed systems and methods modify orientation of a spherical panorama digital image in three-dimensional space based on changes in orientation to an inertial measurement device and resample pixels based on the modified orientation to generate an enhanced spherical panorama digital image.

20 Claims, 12 Drawing Sheets

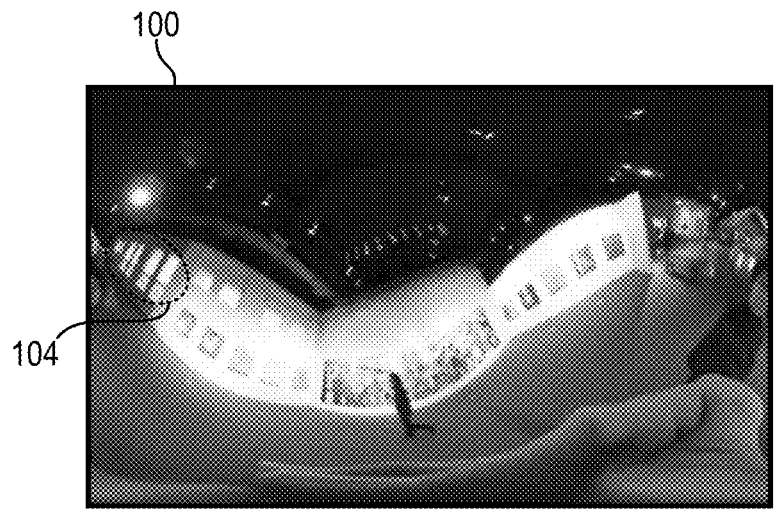
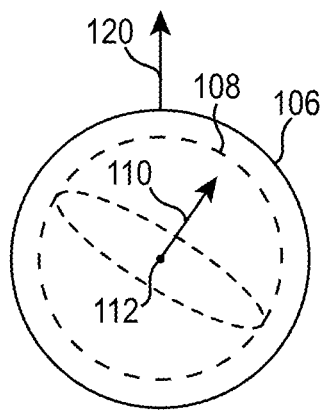
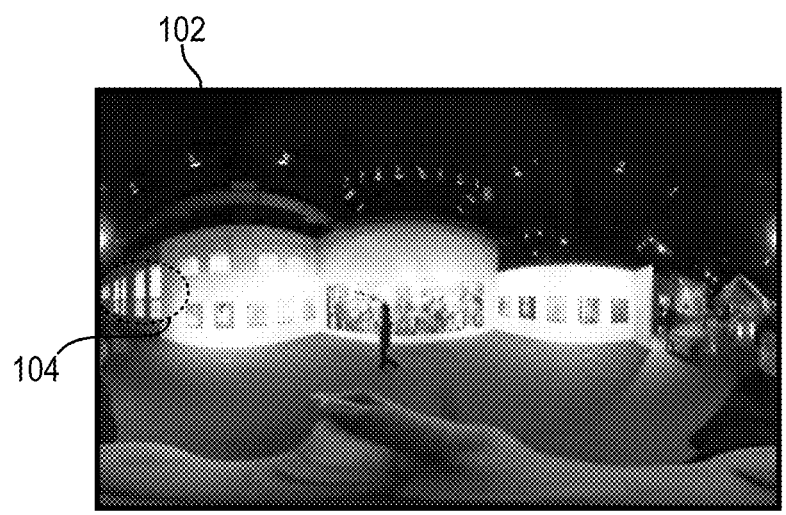
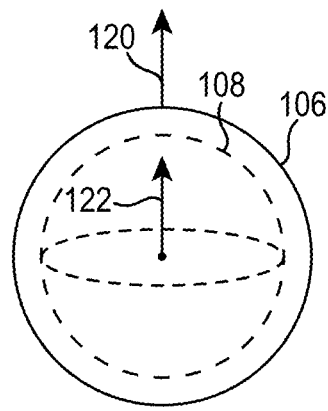
Fig. 1

UTILIZING AN INERTIAL MEASUREMENT DEVICE TO ADJUST ORIENTATION OF PANORAMA DIGITAL IMAGES

BACKGROUND

Recent years have seen rapid development in the area of digital camera devices, particularly digital camera devices capable of capturing spherical panorama digital images. Indeed, consumers now have access to a variety of low-cost, portable digital cameras that can capture spherical panorama digital images for entertainment, personal, or business purposes. For example, some digital cameras now utilize fisheye lenses to capture hemispherical digital images of a scene. Similarly, other digital cameras utilize two wide-angle lenses pointed in opposite directions to capture a 360-degree digital image of a user's surroundings. As a result of the proliferation of such digital cameras, spherical panorama digital images are becoming more popular and widely available.

Although existing digital cameras allow users to capture spherical panorama digital images, users still encounter problems in capturing clear, high-quality panorama digital images. For example, in capturing a spherical panorama digital image, users often tilt and/or roll the digital camera. Digital cameras that are not aligned vertically when capturing spherical panorama digital images cause distortions of the captured scene relative to the axes of the panorama digital image. For example, digital panorama images frequently include slanted objects and/or wavy horizons as a result of tilt and roll when capturing the digital image.

Some conventional digital image processing systems seek to remedy such distortions by actively measuring camera attitude when capturing panorama digital images. For example, some conventional digital image processing systems utilize a gyroscope to measure the attitude of a digital camera as it captures a panorama digital image. Based on the measured camera attitude, some conventional digital processing systems correct for skew in the resulting panorama digital image.

Although such conventional image processing systems can align scenes to axes of a panorama digital image, they also have a number of shortcomings. For example, many cameras lack means for tracking camera attitude with sufficient precision to correct distortions in a spherical panorama digital image. Similarly, even for images inputly captured with such attitude data, it is not uncommon for attitude data to become separated from the spherical panorama digital image. Where existing data regarding camera orientation is not available, conventional digital image processing systems are unable to correct for distortions in orientation in a spherical panorama digital image.

Furthermore, many users seek to modify orientation of spherical panorama digital images. For example, some users seek to adjust orientation of spherical panorama digital images to introduce creative or artistic artifacts for particular applications. Conventional systems fail to provide users with tools for adjusting skew or distortions in a spherical panorama digital image after capture.

These and other problems exist with regard to adjusting orientation of spherical panorama digital images.

BRIEF SUMMARY

One or more embodiments of the present disclosure provide benefits and/or solve one or more of the foregoing or other problems in the art with systems and methods that modify distortions in spherical panorama digital images utilizing an inertial measurement device. In particular, the disclosed systems and methods utilize an inertial measurement device to adjust the orientation of a spherical panorama digital image. To illustrate, the disclosed systems and methods detect orientation changes in relation to an inertial measurement device and, in response, dynamically modify orientation of a spherical panorama digital image. Moreover, the disclosed systems and methods dynamically provide modified spherical panoramic digital images for display in real time based on the orientation changes. In this manner, the disclosed systems and methods provide visual feedback of orientation changes to a spherical panorama digital image based on modifications in orientation to an inertial measurement device, allowing users to intuitively adjust or correct distortions in spherical panorama digital images.

For example, in one or more embodiments, the disclosed systems and methods provide a spherical panorama digital image for display. The spherical panorama digital image includes an initial orientation relative to a three-dimensional space. In addition, the disclosed systems and method detect a change in orientation from the initial orientation of an inertial measurement device. Moreover, the disclosed systems and methods generate an enhanced spherical panorama digital image by changing the initial orientation of the spherical panorama digital image to a modified orientation relative to the three-dimensional space based on the change in orientation of the inertial measurement device.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIG. 1 illustrates a spherical panorama digital image and an enhanced spherical panorama digital image in accordance with one or more embodiments;

DETAILED DESCRIPTION

Figure 2A:
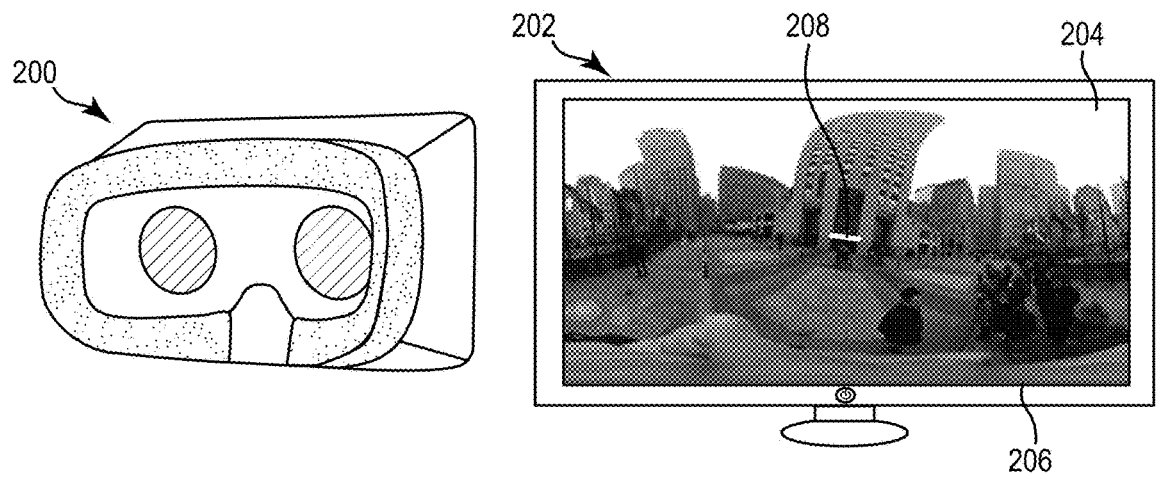
FIGS. 2A-2E illustrate a representation of generating an enhanced spherical panorama digital image based on changes in orientation from an inertial measurement device in accordance with one or more embodiments.

One or more embodiments of the present disclosure include a digital orientation adjustment system that accounts for distortions in spherical panorama digital images. In particular, the digital orientation adjustment system corrects distortions in spherical panorama digital images by utilizing an inertial measurement device. For example, in one or more embodiments, the digital orientation adjustment system provides a spherical panorama digital image for display and detects a change in orientation of an inertial measurement device. The digital orientation adjustment system generates a modified orientation of the spherical panorama digital image based on the change in orientation of the inertial measurement device. Moreover, the digital orientation adjustment system generates an enhanced spherical panorama digital image (e.g., a digital image corrected for skew or other distortions) based on the modified orientation.

As mentioned above, in one or more embodiments, the digital orientation adjustment system adjusts orientation of a spherical panorama digital image relative to a three-dimensional space. In particular, skew and distortions in a spherical panorama digital image are often the result of misalignment of a digital image within a three-dimensional space. To illustrate, a spherical panorama digital image may be captured such that the upright direction in the spherical panorama digital image (i.e., the upright direction of the digital camera utilized to capture the spherical panorama digital image) is not aligned to a true upright direction in three-dimensional space. The digital orientation adjustment system can utilize the inertial measurement device to adjust the orientation of the upright direction relative to the true upright direction. Moreover, the digital orientation adjustment system can provide visual feedback to a user so that the user can modify orientation of the inertial measurement device to produce an enhanced spherical panorama digital image.

Specifically, in one or more embodiments, the digital orientation adjustment system detects a change in orientation to an inertial measurement device. Moreover, the digital orientation adjustment system calculates a modified orientation of the spherical panorama digital image based on the change in orientation to the inertial measurement device. Based on the modified orientation, the spherical panorama digital image applies a rotational matrix to the spherical panorama digital image (i.e., resample the pixels of the spherical panorama digital image based on the modified orientation) to generate a modified spherical panorama digital image at the modified orientation. Upon identifying a final orientation of an inertial measurement device, the digital orientation adjustment system can utilize this approach to generate an enhanced spherical panorama digital image based on the final orientation.

The digital orientation adjustment system can provide modified spherical panorama digital images in a variety of forms. For example, in one or more embodiments, the digital orientation adjustment system projects a modified spherical panorama digital image to a two-dimensional space in providing the modified spherical panorama digital image for display. Based on changes in orientation of an inertial measurement devices, the digital orientation adjustment system can modify orientation of the spherical panorama digital image relative to a three-dimensional space and project the modified spherical panorama digital image to the two-dimensional space for display. This approach allows users to easily see distortions and skew in spherical panorama digital images resulting from misalignment. Indeed, projecting a spherical panorama digital image to a two-dimensional space can result in warping of the spherical panorama digital image that is readily identifiable by a user.

Aside from projecting the spherical panorama digital image to a two-dimensional space, the digital orientation adjustment system can also provide additional visual cues to aid users in modifying orientation of the spherical panorama digital image. For example, in one or more embodiments, the digital orientation adjustment system generates one or more alignment guides and provides the one or more alignment guides for display with the spherical panorama digital image. In particular, the digital orientation adjustment system can generate an alignment guide by detecting a line segment in the spherical panorama digital image (e.g., a horizontal line segment), extending the line segment in three-dimensional space (e.g., projecting the line segment around a great circle within the three-dimensional space corresponding to the spherical panorama digital image) to generate an alignment guide, and projecting the alignment guide back into a two-dimensional space for display with the spherical panorama digital image. As outlined in greater detail below, the alignment guide can provide an additional visual representation of orientation of the spherical panorama digital image.

In addition to providing the spherical panorama digital image (and/or an alignment guide) for display in a two-dimensional space, the digital orientation adjustment system can also dynamically provide spherical panorama digital images for display in a three-dimensional space. For example, in one or more embodiments, the digital orientation adjustment system utilizes a virtual reality device to display a spherical panorama digital image and modify orientation of the spherical panorama digital image. To illustrate, the digital orientation adjustment system can provide a spherical panorama digital image for display in a three-dimensional space via the virtual reality device and modify orientation of the spherical panorama digital image based on changes in orientation to the virtual reality device.

This approach has the advantage of allowing a user to see how the spherical panorama digital image appears in three-dimensional space. For example, a user can more readily see that a horizontal line in a three-dimensional space is slanted relative to the horizon of the three-dimensional space. Similarly, a user can readily see that a vertical orientation of the spherical panorama digital image is not aligned to a true upright orientation in the three-dimensional space. The digital orientation adjustment system can detect changes in orientation of an inertial measurement device to modify alignment of the spherical panorama digital image relative to the three-dimensional space.

To illustrate, in one or more embodiments, the digital orientation adjustment system utilizes a virtual reality device to perform a two-phase adjustment comprising an observing phase and editing phase. In particular, the digital orientation adjustment system executes the observing phase by providing the spherical panorama digital image for display within a three-dimensional space such that changes in orientation of the virtual reality device will change a view of the spherical panorama digital image but will not modify orientation of the spherical panorama digital image relative to the three-dimensional space. Accordingly, a user can look up, down, left, and/or right to observe the orientation of the spherical panorama digital image within the three-dimensional space, while leaving the orientation relative to the three-dimensional space unchanged.

Based on user input and/or other factors described below, the digital orientation adjustment system can then transition to the editing phase. In the editing phase, the digital orientation adjustment system modifies orientation of the spherical panorama digital image relative to the three-dimensional space. For example, the digital orientation adjustment system locks the view of the spherical panorama digital image such that the view of the spherical panorama digital image remains fixed despite changes in orientation of the virtual reality device. With the view locked, in one or more embodiments, the digital orientation adjustment system detects changes in orientation of the virtual reality device and modifies orientation of the spherical panorama digital image relative to the three-dimensional space based on the detected changes in orientation.

In this manner, the digital orientation adjustment system can perform iterative adjustments to orientation of a spherical panorama digital image. For example, by repeatedly alternating between the observing phase (i.e., the "unlocked" view) and the editing phase (i.e., the "locked" view), the digital orientation adjustment system can iteratively adjust orientation of the spherical panorama digital image based on detected changes in orientation to an inertial measurement device.

The digital orientation adjustment system provides a number of advantages over existing image processing systems. For example, by utilizing an inertial measurement device to dynamically adjust orientation of a spherical panorama digital image, the digital orientation adjustment system quickly and efficiently accounts for skew in a spherical panorama digital image, even without the benefit of attitude readings at the time the spherical panorama digital image is captured. Indeed, by dynamically providing a spherical panorama digital image for display with different orientations based on orientation changes to an inertial measurement device, the digital orientation adjustment system allows users to intuitively adjust orientation to account for distortions in the spherical panorama digital image.

Furthermore, the digital orientation adjustment system also provides additional flexibility in adjusting orientation of spherical panorama digital images. For example, rather than modifying orientation of a spherical panorama digital image to correct all distortions, the digital orientation adjustment system can allow users to adjust orientation to introduce creative orientation changes in a spherical panorama digital image (e.g., create a spherical panorama digital image with a purposeful tilt).

Similarly, the digital orientation adjustment system also allows users to align multiple spherical panorama digital images. For example, based on changes in orientation of in an inertial measurement device, the digital orientation adjustment system can align two 180-degree spherical panorama digital images to generate a 360-degree spherical panorama digital image. In addition, the digital orientation adjustment system can utilize changes in orientation of an inertial measurement device to orient a first spherical panorama digital image as an overlay to a second spherical panorama digital image.

Additional detail will now be provided regarding the digital orientation adjustment system in relation to illustrative figures portraying exemplary embodiments. In particular, FIG. 1 portrays an input spherical panorama digital image 100 at an initial orientation 110 relative to a three-dimensional space 106 and an enhanced spherical panorama digital image 102 at a final orientation 122 relative to the three-dimensional space 106. In particular, the enhanced spherical panorama digital image 102 illustrates the input spherical panorama digital image 100 upon application of one or more embodiments of the digital orientation adjustment system modifying orientation of the spherical panorama digital image from the initial orientation 110 to the final orientation 122.

As used herein, the term "spherical panorama digital image" refers to a digital image that includes an enlarged field of view. In particular, the term "spherical panorama digital image" refers to a digital image that include a field of view that extends beyond a field of view of the human eye. For example, the term "spherical panorama digital image" includes a panorama digital image captured by a fish-eye lens. Similarly, a "spherical panorama digital image" includes a panorama digital image that portrays at least 180 degrees of a horizontal field of view (e.g., 180 degrees of a scene in the real world). In addition, the term "spherical panorama digital image" includes a panorama digital image that portrays 360 degrees of horizontal field of view and at least 180 degrees of a vertical field of view. For instance, a spherical panorama digital image includes a panorama digital image captured by a digital camera that portrays a representation of objects in front of, behind, and to the sides of the digital camera. Alternatively, a spherical panorama digital image is a set of images stitched together. A spherical panorama digital image can be a part of a sequence of spherical panorama digital images making up a spherical panorama digital movie.

While the exemplary embodiments are described as applying to spherical panoramas, the techniques disclosed herein also may be applied to other formats of panoramas including cubic panoramas and cylindrical panoramas, and also to other imagery, such as fish-eye views and perspective images.

Accordingly, in relation to FIG. 1, the input spherical panorama digital image 100 is a digital image that portrays 360 degrees of a horizontal field of view. Moreover, the enhanced spherical panorama digital image 102 portrays 360 degrees of a horizontal field of view upon correction of skew in the input spherical panorama digital image 100.

As shown in FIG. 1, the digital camera utilized to capture the input spherical panorama digital image 100 was not vertically aligned, and, therefore, generates a digital image with a number of distortions. For example, the input spherical panorama digital image 100 portrays a plurality of windows 104. As shown, the plurality of windows 104 are skewed, such that the windows 104 appear to be slanted from a horizontal orientation. In particular, it appears that the windows 104 project into a horizon that is not aligned to axes of the input spherical panorama digital image 100.

Similar to the plurality of windows 104, the remaining structures and objects in the input spherical panorama digital image are bended, distorted, and skewed. Indeed, it appears that the floor and structures portrayed in the input spherical panorama digital image 100 are warped (e.g., rise and fall across the field of view of the input spherical panorama digital image 100). Such distortions are common in spherical panorama digital images as a result of tilt and/or roll in the digital camera that skew the initial orientation of the input spherical panorama digital image 100.

As used herein, the term "orientation" refers to a direction that defines an alignment of an object in three-dimensional space. In particular, the term "orientation" can include a direction in three-dimensional space (e.g., an azimuth and elevation) that defines a perspective portrayed in a spherical panorama digital image or that defines an alignment of an inertial measurement device. For example, the term "orientation" can include a vector defining a direction of a digital camera utilized to capture a spherical panorama digital image. Similarly, the term "orientation" can include a vector defining a direction of an inertial measurement device.

As used herein, the term "three-dimensional space" refers to a geometric space or model defined by three dimensions. Thus, the position of a point within a three-dimensional space is defined by three values. In particular, the term three-dimensional space includes a geometric model of a spherical panorama digital image, wherein three values determine the position of pixels of the spherical panorama digital image within the geometric model. Thus, positions in a three-dimensional space can be described relative to a set of three values, such as a set of rectangular coordinates (x, y, z), cylindrical coordinates (ρ, φ, z), or spherical coordinates (r, θ, φ).

As used herein, the term "two-dimensional space" refers to a geometric space or model defined by two dimensions. Thus, the position of a point within a two-dimensional space is defined by two values. In particular, the term two-dimensional space includes a geometric model with a spherical panorama digital image, wherein two values determine the position of pixels of the spherical panorama digital image within the geometric model. Thus, positions in a two-dimensional space can be described relative to a set of two values, such as a set of Cartesian coordinates (x, y) or polar coordinates (r, θ).

For example, in relation to FIG. 1, contents of the input spherical panorama digital image 100 are portrayed in a two-dimensional space. Moreover, contents of the enhanced spherical panorama digital image 102 are also portrayed in a two-dimensional space. In both instances, the pixels of the spherical panorama digital images 100, 102 are defined by two-dimensional coordinates.

Spherical panorama digital image can also be portrayed in a three-dimensional space. For example, FIG. 1 illustrates representations of the spherical panorama digital images 100, 102 in the three-dimensional space 106. Specifically, pixels of the spherical panorama digital images 100, 102 are represented on a unit sphere 108 (i.e., a unit sphere centered on a location of a digital camera 112 utilized to capture the spherical panorama digital image) within the three-dimensional space 106.

The representation of the input spherical panorama digital image 100 in three-dimensional space illustrates the orientation misalignment causing the distortions discussed above. The initial orientation 110 is a vector reflecting a vertical direction relative to the alignment of the digital camera 112 at the time the input spherical panorama digital image 100 was captured. As illustrated, because of tilt and/or roll in the digital camera at the time of capture the initial orientation 110 is not aligned to a true vertical direction 120 of the three-dimensional space 106.

In one or more embodiments, the digital orientation adjustment system corrects distortions in spherical panorama digital images by identifying a modified orientation utilizing an inertial measurement device. In particular, in relation to FIG. 1, the digital orientation system utilizes an inertial measurement device to identify the final orientation 122.

As used herein, the term "inertial measurement device" refers to a device that can detect a change in orientation of an object. In particular, the term "inertial measurement device" includes an electronic device that measures an object's specific force, angular rate, and/or magnetic field utilizing one or more accelerometers, gyroscopes, and/or magnetometers. In particular, an inertial measurement device includes a device that detects a change in pitch, a change in roll, and/or a change in yaw of an object. Thus, for example, the term "inertial measurement device" can include a virtual reality device (i.e., a head-mounted virtual reality device), a smartphone (e.g., a smartphone with accelerometers, gyroscopes, and/or magnetometers for detecting change in orientation), a controller, or a joystick.

For example, in relation to FIG. 1, the digital orientation adjustment system identifies the final orientation 122 based on a change in orientation to an inertial measurement device. In particular, the digital orientation adjustment system detects changes in orientation of an inertial measurement device. The digital orientation adjustment system generates a modified spherical panorama digital image reflecting the changes in orientation. Then the digital orientation adjustment system provides visual feedback by providing modified spherical panorama digital images for display in real time. This allows a user to further modify orientation of an inertial measurement based on the modified spherical panorama digital images provided for display. Based on this dynamic visual feedback and additional modifications in orientation to the inertial measurement device, the digital orientation adjustment system can identify the final orientation 122, which reflects a corrected vertical pole of the scene captured in the input digital spherical panorama digital image 100. In other words, the final orientation 122 reflects an orientation without tilt and/or roll of the digital camera 112 such that the modified orientation aligns with the true vertical direction 120.

Upon identifying the final orientation 122, the digital orientation adjustment system modifies the input spherical panorama digital image 100 to generate the enhanced spherical panorama digital image 102. In particular, upon identifying the final orientation 122, the digital orientation adjustment system can apply a rotational matrix to re-orient the sphere 108 to the final orientation 122. Moreover, the digital orientation adjustment system can resample pixels of the input spherical panorama digital image 100 utilizing the final orientation 122 to correct distortions or skew. Further, the digital orientation adjustment system can project pixels of the input spherical panorama digital image 100 based on the final orientation 122 to a two-dimensional space to generate the enhanced spherical panorama digital image 102.

Indeed, as shown in FIG. 1, utilizing this process, the digital orientation adjustment corrects the distortions in the input spherical panorama digital image 100. As shown in the enhanced spherical panorama digital image 102, the digital orientation adjustment system corrects pixels portraying the plurality of windows 104 to appear to be aligned to axes of the enhanced spherical panorama digital image 102. Moreover, the digital orientation adjustment system aligns, without irregular distortions or bends, structures and other objects in the enhanced spherical panorama digital image 102.

Turning now to FIGS. 2A-2E, additional detail will be provided regarding generating an enhanced spherical panorama digital image utilizing an inertial measurement device in accordance with one or more embodiments. In particular, FIGS. 2A-2E illustrate generating and modifying a spherical panorama digital image and alignment guide in a two-dimensional space to generate an enhanced spherical panorama digital image in accordance with one or more embodiments.

In particular, FIG. 2A illustrates an inertial measurement device 200 and a computing device 202 with a screen 204. The inertial measurement device 200 is operably connected to the computing device 202 via a network, such that the computing device 202 and the measurement device 200 can communicate. As shown, the digital orientation adjustment system provides a spherical panorama digital image 206 for display in a two-dimensional space via the screen 204. Specifically, in relation to the embodiment of FIG. 2A, the digital orientation adjustment system accesses the spherical panorama digital image 206. The digital orientation adjustment system maps the spherical panorama digital image 206 to a two-dimensional space at an initial orientation (i.e., the orientation corresponding to how the spherical panorama digital image 206 was captured). Then the digital orientation adjustment system provides the spherical panorama digital image for display via the computing device 202.

As shown, the spherical panorama digital image 206 contains a variety of distortions (such as warping of buildings, trees, and other structures). As discussed previously, these distortions result from misalignment of the initial orientation of the spherical panorama digital image relative to a three-dimensional space (e.g., the digital camera that captured the spherical panorama digital image 206 was not vertically aligned).

As mentioned above, in one or more embodiments, the digital orientation adjustment system generates an alignment guide to provide an additional visual indication of the distortion of the spherical panorama digital image 206. In particular, the digital orientation adjustment system identifies a line segment in the spherical panorama digital image 206 and then projects the line segment into a three-dimensional space. When projecting the line segment, the digital orientation adjustment system extends the line segment in the three-dimensional space to generate an alignment guide, and then projects the alignment guide back into the two-dimensional space.

As used herein, the term "line segment" refers to a locally straight contour in a digital image. In particular, the term "line segment" includes an edge portrayed in a digital image. Similarly, the term "line segment" includes a line portrayed in a digital image bounded by two end points. The term "line segment" can include a "vertical line segment" and a "horizontal line segment." A vertical line segment refers to a line segment with a gradient in a vertical direction. For example, a vertical line segment includes a line segment portrayed in a digital image that points toward a vertical pole. Moreover, a horizontal line segment refers to a line segment with a gradient in a horizontal direction. For example, a horizontal line segment includes a line segment that points toward a horizon. In addition, a horizontal line segment includes a line segment portrayed in a digital image that points toward a vanishing point on the horizon.

For example, as illustrated in FIG. 2A, the digital orientation adjustment system identifies a horizontal line segment 208. The digital orientation adjustment system can identify the horizontal line segment utilizing a variety of approaches. For example, in one or more embodiments, the digital orientation adjustment system utilizes a line segment detection algorithm, as described, for example, in von Gioi, R., Jakubowicz, J., Morel, J.-M, & Randall, G., LSD: A fast line segment detector with a false detection control, IEEE PAMI 32, 722-732 (2010), which is incorporated herein by reference in its entirety. Alternatively, the digital orientation adjustment system utilizes an EDLines algorithm, as described in relation to Akinlar, C. & Topal, C., Edlines: A real-time line segment detector with a false detection control, Pattern Recognition Letters 32, 1633-1642 (2011), which is also incorporated herein by reference in its entirety. Indeed, the digital orientation system can utilize a variety of different types of line segment detection schemes (in isolation or in combination) to identify line segments in a spherical panorama digital image.

Moreover, the digital orientation adjustment system can identify vertical line segments and/or horizontal line segments. In particular, in one or more embodiments, the digital orientation adjustment system filters vertical line segments and horizontal line segments from other line segments by applying one or more thresholds. For example, in identifying vertical line segments, the digital orientation adjustment system applies a vertical angle threshold. Specifically, the digital orientation adjustment system applies a vertical angle threshold. In particular, the digital orientation adjustment system classifies detected line segments with gradients (i.e., slopes) that satisfy the vertical angle threshold as vertical line segments. Along related lines, the digital orientation adjustment classifies detected line segments with gradients (i.e., slopes) that do not satisfy the vertical angle threshold as not being vertical line segments. In relation to FIG. 2A, the digital orientation adjustment system identifies the horizontal line segment 208 utilizing a line segment detector together with a horizontal angle threshold.

Figure 2B:
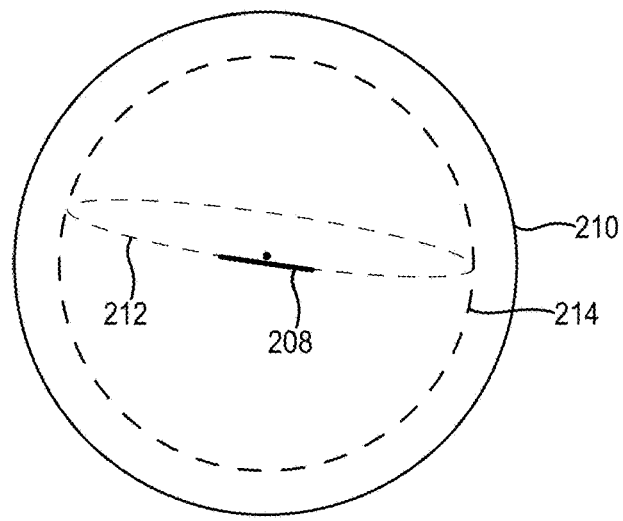

As mentioned, upon identifying a line segment, the digital orientation adjustment system can project the line segment into a three-dimensional space. For example, FIG. 2B illustrates the horizontal line segment 208 projected into a three-dimensional space 210. In particular, the digital orientation adjustment system projects the line segment onto a sphere 214 (i.e., a unit sphere) in the three-dimensional space 210 centered on a location of a digital camera utilized to capture the spherical panorama digital image 206. As shown, the digital orientation adjustment system also extends the line segment in a great circle (i.e., a circle of the largest possible circumference) around the sphere 214 to generate an alignment guide 212.

Figure 2C:
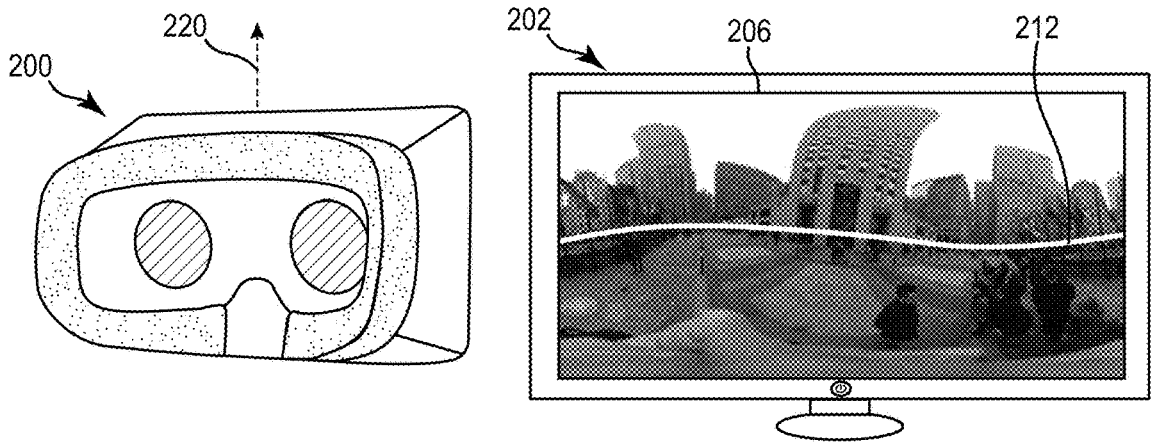

As mentioned, upon generating an alignment guide in a three-dimensional space, the digital orientation adjustment system can also project the alignment guide to a two dimensional space. Indeed, as shown in FIG. 2C, the digital orientation adjustment system projects the great circle (i.e., the alignment guide 212) into a two-dimensional space with the spherical panorama digital image 206. In particular, the digital orientation adjustment system provides the alignment guide 212 for display together with the spherical panorama digital image 206 in a two-dimensional space via the computing device 202. With the alignment guide 212 and the spherical panorama digital image 206 provided for display, a user can readily visualize distortion in the spherical panorama digital image 206.

As mentioned above, the digital orientation adjustment system can also detect changes in orientation to an inertial measurement device and dynamically modify a spherical panorama digital image and/or an alignment guide in response. Indeed, the digital orientation adjustment system can provide modifications to a spherical panorama digital image for display, thus allowing a user to intuitively adjust orientation of a spherical panorama digital image.

Figure 2D:
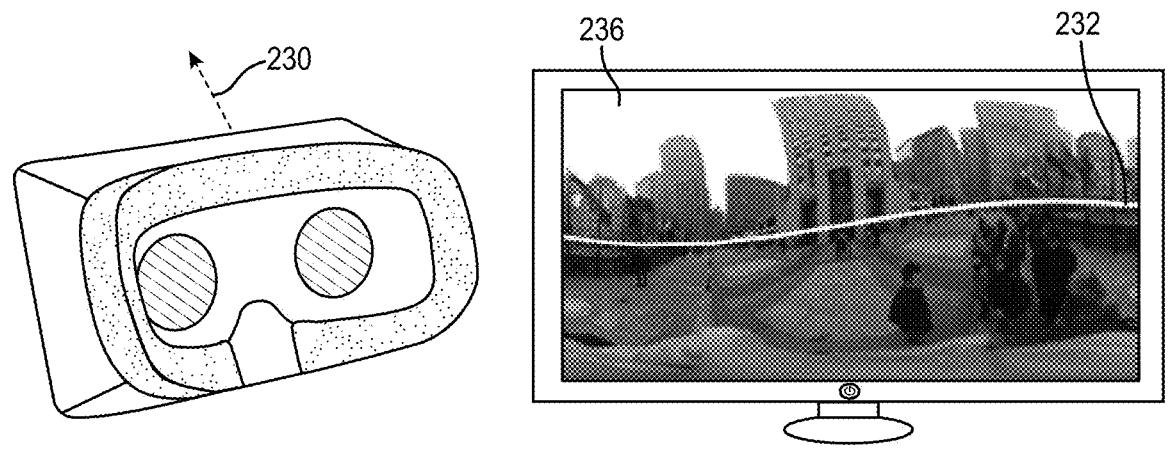

For example, FIG. 2C illustrates the inertial measurement device 200 at a first orientation 220, while FIG. 2D illustrates the inertial measurement device 200 at a second orientation 230. As shown, the digital orientation adjustment system detects the change in orientation from the first orientation 220 to the second orientation 230 and generates a modified spherical panorama digital image 236 and a modified alignment guide 232 based on the detected change in orientation.

Specifically, the digital orientation adjustment system determines a modified orientation based on the change in orientation of the inertial measurement device. For instance, the digital orientation adjustment system determines that the inertial measurement device rotates along a particular axis by 5 degrees. In response, the digital orientation adjustment system determines a modified orientation of the spherical panorama digital image that is rotated along the particular axis by 5 degrees.

Although the foregoing example changes orientation of a spherical panorama digital image by the same amount as the detected change in orientation of the inertial measurement device, it will be appreciated that the digital orientation adjustment system can apply different orientation changes to a spherical panorama digital image than changes in orientation detected at an inertial measurement device. For example, to provide greater precision, the digital orientation adjustment system calculates a modified orientation of a spherical panorama digital image that is a certain percentage of a change in orientation of an inertial measurement device (e.g., 10 degrees of change in an inertial measurement device results in a 5 degree modified orientation of a spherical panorama digital image).

Upon calculating a modified orientation, the digital orientation adjustment system can apply the modified orientation to the spherical panorama digital image 206. In particular, the digital orientation adjustment system can modify the spherical panorama digital image 206 by rotating the sphere 214 by the modified orientation within the three-dimensional space 210. For instance, the digital orientation adjustment system can calculate a rotation matrix based on the modified orientation. Moreover, the digital orientation adjustment system can identify a first location of each pixel in the spherical panorama digital image 206, apply the rotation matrix to each pixel in the spherical panorama digital image 206, and determine a second location of each pixel in the three-dimensional space 210. The digital orientation adjustment system can then utilize the second location of each pixel in the three-dimensional space 210 as pixels in a modified spherical panorama digital image. Additional detail regarding the rotational matrix and resampling pixels to generate a modified spherical panorama digital image is provided below in relation to FIG. 6.

In addition to generating a modified spherical panorama digital image, the digital orientation adjustment system can also generate a modified alignment guide. In particular, as illustrated in FIG. 2D, the digital orientation adjustment system generates a modified alignment guide 232 based on the change in orientation from the first orientation 220 to the second orientation 230. Specifically, as just discussed, the digital orientation adjustment system can generate a rotational matrix based on the change in orientation of the inertial measurement device 200. Moreover, the digital orientation adjustment system can apply the rotational matrix to the alignment guide 212 (e.g., the pixels making up the horizontal line segment 208 and/or the pixels making up the alignment guide 212) to generate the modified alignment guide 232. For example, the digital orientation adjustment system can rotate the alignment guide 212 in the three-dimensional space 210 based on the rotational matrix to generate the modified alignment guide 232. Moreover, the digital orientation adjustment system can project the modified alignment guide 232 from the three-dimensional space 210 to a two-dimensional space, as shown in FIG. 2D.

As illustrated by comparing FIGS. 2C and 2D, the digital orientation adjustment system dynamically provides modified spherical panorama digital images for display to a user, thus allowing a user to intuitively modify orientation of the inertial measurement device 200 and orientation of the spherical panorama digital image. Indeed, the digital orientation adjustment system can iteratively detect changes in orientation to the inertial measurement device and generate modified spherical panorama digital images (and modified alignment guides) to aid a user in identifying a desired final orientation. Moreover, upon detecting a final orientation, the digital orientation adjustment system can generate an enhanced spherical panorama digital image.

Figure 2E:
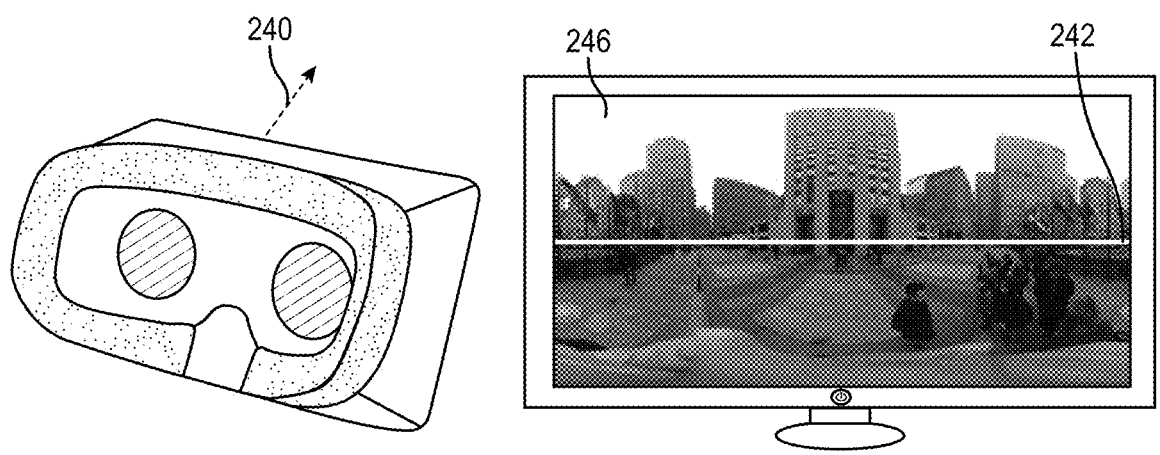

For example, FIG. 2E illustrates the inertial measurement device 200 at a third orientation 240. At the third orientation 240, the digital orientation adjustment system has rotated the spherical panorama digital image 206 and the alignment guide 212 based on the third orientation 240 to generate an enhanced spherical panorama digital image 246 and a modified alignment guide 242. As shown, the enhanced spherical panorama digital image 246 no longer contains distortions and the alignment guide 242 is no longer warped. In particular, a user of the inertial measurement device 200 iteratively modifies the orientation of the inertial measurement device 200 to the third orientation 240 corresponding to a modified orientation that correct distortions in the spherical panorama digital image 206. In this manner, the digital orientation adjustment system can utilize an inertial measurement device to adjust orientation of a spherical panorama digital image to generate an enhanced spherical panorama digital image.

Notably, in relation to FIGS. 2A-2E, the inertial measurement device 200 is illustrated as a virtual reality device. As used herein, the term "virtual reality device" refers to an inertial measurement device capable of displaying a digital, three-dimensional representation of a three-dimensional space. In particular, the term "virtual reality device" includes a computing device (e.g., a headset or head-mounted display) that displays a digital, three-dimensional view of a virtual environment that simulates a user's physical presence through a generated sensory experience. To illustrate, a virtual reality device includes a head-mounted display that displays an immersive three-dimensional representation of one or more spherical panorama digital images. For example, a virtual reality device can modify a view of one or more spherical panorama digital images based on user movements to simulate physical presence in a three-dimensional space corresponding to the spherical panorama digital images (e.g., presence at the location of the digital camera where the spherical panorama digital image was captured).

It will be appreciated that although FIGS. 2A-2E illustrate the inertial measurement device 200 as a head-mounted virtual reality device, the inertial measurement device 200 can comprise any type of inertial measurement device. For instance, as mentioned above, the inertial measurement device 200 can comprise a smartphone, controller, joystick, or other device capable of detecting changes in orientation. Moreover, in relation to embodiments that utilize a head-mounted virtual reality device, it will be appreciated that the digital orientation adjustment system can operate with the user wearing the head-mounted virtual reality device or simply holding the virtual reality device (i.e., utilizing the head-mounted virtual reality device to modify orientation without wearing the head-mounted virtual reality device).

In addition, although FIGS. 2A-2E illustrate an inertial measurement device 200 and a separate computing device 202, it will be appreciated that the digital orientation adjustment system can modify a spherical panorama digital image utilizing a single computing device. For example, in one or more embodiments, the digital orientation adjustment system utilizes an inertial measurement device (such as a smartphone) that can both detect changes in orientation and display modified spherical panorama digital images. To illustrate, in one or more embodiments, the digital orientation adjustment system is implemented on a smartphone such that the digital orientation adjustment system dynamically detects changes in orientation to the smartphone and dynamically provides modified spherical panorama digital images for display via a smartphone touchscreen based on the changes in orientation. Similarly, in one or more embodiments the digital orientation adjustment system is implemented via a virtual reality device that detects orientation changes and also provides modified spherical panorama digital images for display (i.e., displayed in a two-dimensional space or a three-dimensional space via the virtual reality device).

Furthermore, although the description above in relation FIG. 2A describes providing the spherical panorama digital image 206 for display based on an orientation of the spherical panorama digital image, it will be appreciated that in one or more embodiments, the digital orientation adjustment system also provides the spherical panorama digital image 206 for display based on an initial orientation of the inertial measurement device. For example, if the inertial measurement device is already rotated to a particular orientation (i.e., a particular orientation that varies from an upright orientation), the digital orientation adjustment system can rotate the spherical panorama digital image based on the particular orientation. For example, if the inertial measurement device is initially rotated five degrees in roll, the digital orientation adjustment system can provide the spherical panorama digital image 206 for display by applying an additional five degrees of roll at the outset.

As discussed above, in addition to providing a spherical panorama for display and modifying a spherical panorama digital image in a two-dimensional space, the digital orientation adjustment system can also provide a spherical panorama digital image for display and modify a spherical panorama digital image in a three-dimensional space. For instance, as mentioned above, the digital orientation adjustment system can provide a spherical panorama digital image for display at an initial orientation in a three-dimensional space and then modify the orientation of the spherical panorama digital image in the three-dimensional space based on changes in orientation to an inertial measurement device. Specifically, in one or more embodiments, the digital orientation adjustment system utilizes an observation phase (for observing orientation of a spherical panorama digital image in a three dimensional space) and an editing phase (for modifying orientation of the spherical panorama digital image relative to the three-dimensional space).

Figure 3A:
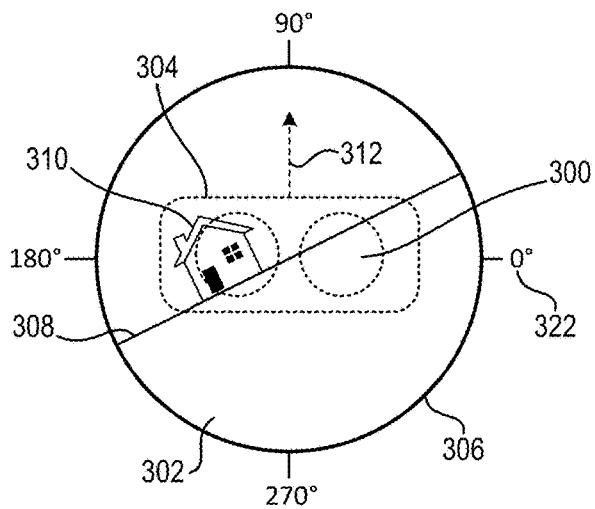
FIGS. 3A-3C illustrate a representation of generating an enhanced spherical panorama digital image based on a change in roll of an inertial measurement device in accordance with one or more embodiments.
Figure 3B:
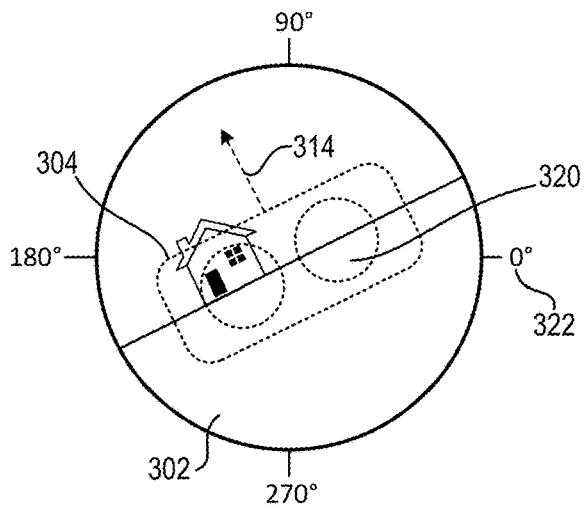
Figure 3C:
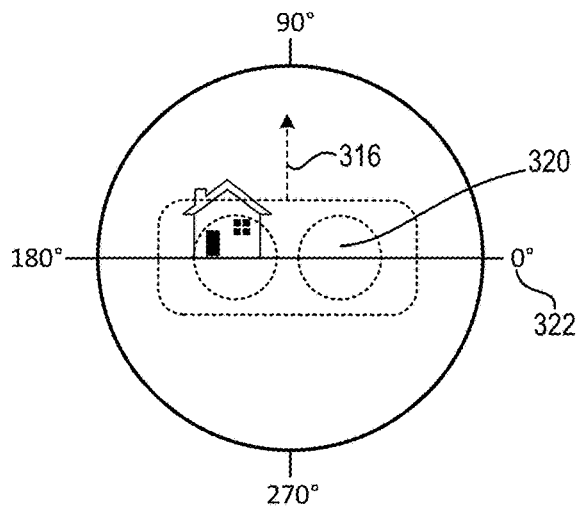

For example, FIGS. 3A-3C illustrate displaying and modifying orientation of a spherical panorama digital image in a three-dimensional space in accordance with one or more embodiments. In particular, FIG. 3A illustrates a view 300 of a spherical panorama digital image 302 in a three-dimensional space 306 via a virtual reality device 304. In particular, the digital orientation adjustment system generates the view 300 from a location in the three-dimensional space 306 corresponding to the location of a digital camera that captured the spherical panorama digital image 302. In this manner, the digital orientation adjustment system creates an immersive experience of the spherical panorama digital image 302 via the virtual reality device 304 (i.e., the spherical panorama digital image 302 appears to surround the user as portrayed in the view 300 of the virtual reality device 304).

As shown, the spherical panorama digital image 302 is aligned at an initial orientation relative to the three-dimensional space 306. Indeed, because the spherical panorama digital image 302 was captured by a digital camera that was not vertically aligned in three-dimensional space, a horizon line 308 and a home 310 in the view 300 of the spherical panorama digital image appear slanted in relation to the three-dimensional space 306 (i.e., the horizon line 308 does not align with the horizon of the three dimensional space 306 at zero degrees).

As mentioned above, in one or more embodiments, the digital orientation adjustment system utilizes an observation phase to allow a user to observe and identify orientation of a spherical panorama digital image. Thus, for example, a user can modify orientation of the virtual reality device 304 and, in response, the digital orientation adjustment system modifies the view 300 of the spherical panorama digital image 302 (without modifying the orientation of the spherical panorama digital image relative to the three-dimensional space). Thus, for example, a user of the digital orientation adjustment system can look left, right, up, or down (or tilt their head) to obtain different views of the spherical panorama digital image 302 via the virtual reality device 304.

For instance, FIG. 3B illustrates modifying a view of a spherical panorama digital image based on changes in orientation to an inertial measurement device (e.g., in the observation phase). As shown in FIG. 3B, the user changes the virtual reality device 304 from a first orientation 312 to a second orientation 314. In response, the digital orientation adjustment system generates a modified view 320 of the spherical panorama digital image 302 (i.e., such that the horizon line 308 and the home 310 do not appear slanted in the modified view 320 as a result of the change in roll). Notably, although the digital orientation adjustment system generates the modified view 320 (changing what the user observes), the digital orientation adjustment system does not modify the orientation of the spherical panorama digital image relative to the three-dimensional space 306.

As mentioned above, the digital orientation adjustment system can also utilize an editing phase to modify orientation of a spherical panorama digital image in a three-dimensional space. For instance, in response to user input while the virtual reality device 304 is aligned in the second orientation 314, the digital orientation adjustment system can enter an editing phase and modify orientation of the spherical panorama digital image 302. In particular, in the editing phase, the digital orientation adjustment system can modify orientation of the spherical panorama digital image 302 relative to the three-dimensional space 306 based on changes in orientation to the virtual reality device 304. Specifically, the digital orientation adjustment system can lock the view 320 so that changes in orientation of the virtual reality device 304 do not modify the view 320, but modify orientation of the spherical panorama digital image relative to the three-dimensional space 306.

For example, as shown in FIG. 3C, the digital orientation adjustment system modifies orientation of the spherical panorama digital image 302 relative to the three-dimensional space 306 based on a change in orientation of the visual reality device 304. In particular, the digital orientation adjustment system detects a change in orientation of the virtual reality device 304 from the second orientation 314 to a third orientation 316. Based on the detected change in orientation, the digital orientation adjustment system modifies orientation of the spherical panorama digital image in the three-dimensional space 306. Specifically, while the view 320 is locked, the digital orientation adjustment system detects a change in roll of the virtual reality device that aligns the horizon line 308 to a horizontal direction within the three-dimensional space 306. In this manner, a user can lock a view and re-orient a spherical panorama digital image in a three-dimensional space based on a change in orientation to an inertial measurement device.

The digital orientation adjustment system can also provide one or more alignment guides (i.e., a visual indication of orientation in three-dimensional space) to assist a user in modifying orientation of a spherical panorama digital image within a three-dimensional space. To illustrate, in one or more embodiments, the digital orientation adjustment system provides a line and/or compass in the view 320 to indicate the rotation of the virtual reality device 304 relative to the three-dimensional space 306. For example, in one or more embodiments, the digital orientation adjustment system provides an alignment guide comprising a line showing a horizontal direction and/or a vertical direction relative to the virtual reality device 304. A user can utilize such an alignment guide to align a horizontal direction (and/or vertical direction) of the virtual reality device with a horizontal line (and/or vertical line) portrayed in a spherical panorama digital image (e.g., align a horizontal line alignment guide with the horizontal line 308). Moreover, a user can utilize such an alignment guide to align a horizontal direction (and/or vertical direction) of the virtual reality device with a horizon in the three-dimensional space 306.

In addition to an alignment guide illustrating orientation relative to the virtual reality device 304, the digital orientation adjustment system can also generate an alignment guide illustrating orientation relative to the three-dimensional space. For example, in one or more embodiments, the digital orientation adjustment system provides a visual representation of a compass 322 shown in FIGS. 3A-3C, indicating degrees of rotation relative to the three-dimensional space. Such an alignment guide can assist in providing visual cues of orientation relative to the three-dimensional space, even when the view is locked in editing mode. To illustrate, the compass 322 can rotate around the views 300, 320 to provide a visual indication of change in rotation between the virtual reality device 304 and the three-dimensional space 306. Thus, the digital orientation adjustment system can generate a compass alignment guide based on the orientation of the virtual reality device. While the view is locked, the digital orientation adjustment system can modify (e.g., rotate) the compass alignment guide based on a modified orientation of the virtual reality device. Moreover, while the view is locked, the digital orientation adjustment system can provide the modified compass alignment guide for display together with the locked view of the spherical panorama digital image. In this manner, the digital orientation adjustment system can utilize a compass alignment guide to assist a user in aligning a spherical panorama digital image to a three-dimensional space.

It will be appreciated that although the foregoing example utilizes a compass to illustrate relative orientation between the three-dimensional space and the virtual reality device, the digital orientation adjustment system can utilize a variety of visual indicators. For example, the digital orientation adjustment system can utilize a dot, line, or other icon to indicate a measure of rotation of the virtual reality device 304 relative to the three-dimensional space 306.

Furthermore, although FIGS. 3A-3C illustrate modifying orientation of a spherical panorama digital image based on a change in roll of an inertial measurement device, it will be appreciated that the digital orientation adjustment system can also change orientation of a spherical panorama digital image based on changes in roll and/or yaw of an inertial measurement device. For example, FIGS. 4A-4C illustrate modifying orientation of a spherical panorama digital image based on changes in pitch of an inertial measurement device.

Figure 4A:
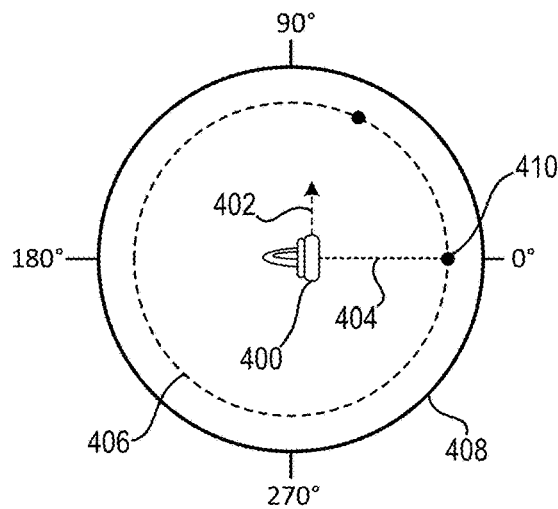
FIGS. 4A-4C illustrate a representation of generating an enhanced spherical panorama digital image based on a change in pitch in an inertial measurement device in accordance with one or more embodiments.

In particular, FIG. 4A illustrates a profile of a virtual reality device 400 at a first orientation 402. As shown, the digital orientation adjustment system generates a view 404 of a spherical panorama digital image 406 in a three-dimensional space 408 via the virtual reality device 400. For example, the view 404 includes a portion of the spherical panorama digital image 406 portraying a ground object 410 (e.g., shoes, feet, rocks, or some other object on the ground portrayed in the spherical panorama digital image 406). The view 404 includes the ground object 410 because the spherical panorama digital image is not aligned to the three-dimensional space 408 (e.g., items on the ground, such as feet or rocks, appear on the horizon, at zero degrees in the three-dimensional space 408, rather than at the bottom of the three-dimensional space 408).

As described above, the digital orientation adjustment system can utilize an observation phase to provide visual cues to a user regarding the orientation of the spherical panorama digital image 406 relative to the three-dimensional space 408. For example, a user can modify orientation of the virtual reality device 400 to observe the orientation of the spherical panorama digital image within the three-dimensional space 408.

Figure 4B:
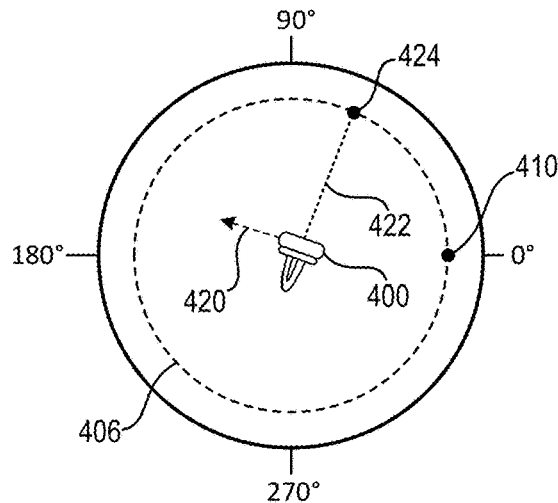
Figure 4C:
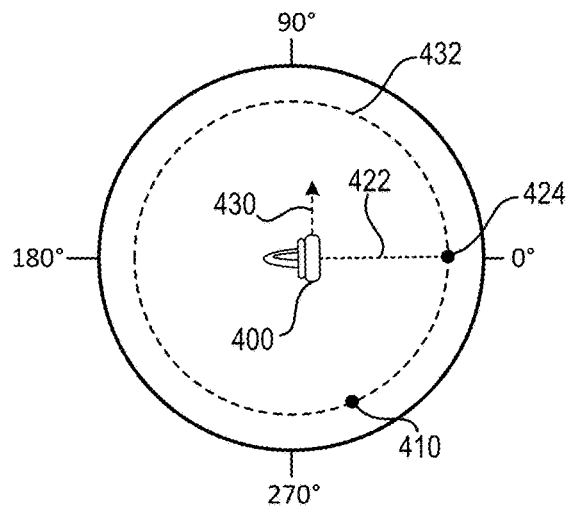

Indeed, as shown in FIG. 4B, the digital orientation adjustment system detects a change in pitch of the virtual reality device 400 to a second orientation 420 (i.e., detects a user wearing the virtual reality device 400 moving their head to look upwards). Accordingly, the digital orientation adjustment system generates a modified view 422 that portrays a horizon 424 in the spherical panorama digital image 406. As shown, the view 422 includes the horizon 424 because the spherical panorama digital image is not aligned to the three-dimensional space 408 (e.g., the horizon 424 appears to be in the sky, rather than along the horizon of the three-dimensional space 408).

The digital orientation adjustment system can enter the editing phase, lock the view 422, and modify orientation of the spherical panorama digital image 406 relative to the three-dimensional space 408 based on additional changes in orientation to the virtual reality device 400. For example, in relation to FIG. 4C, the digital orientation adjustment system locks the view 422 and detects a third orientation 430 of the virtual reality device 400 (i.e., the user looks down with the virtual reality device 400 while in the editing phase). In response, the digital orientation adjustment system generates a modified spherical panorama digital image 432 based on the change in pitch between the second orientation 420 and the third orientation 430. Specifically, the digital orientation adjustment system generates the modified spherical panorama digital image 432 with the horizon 424 aligned with a horizon of the three-dimensional space 408. Moreover, the ground object 410 is oriented in the bottom of the three-dimensional space 408. In this manner, the digital orientation adjustment system can modify lock a view of spherical panorama digital images and modify orientation of the spherical panorama digital image relative to a three-dimensional space utilizing an inertial measurement device.

As illustrated in relation to FIGS. 3A-4C, the digital orientation adjustment system iteratively modifies orientation of spherical panorama digital images in a three-dimensional space. For instance, as shown in FIG. 3A-3C, a user modifies a roll of a spherical panorama digital image and then, as shown in FIGS. 4A-4C, modifies a pitch of a spherical panorama digital image. Thus, the digital orientation adjustment system can iteratively modify a variety of orientations in ultimately generating an enhanced spherical panorama digital image. To illustrate, the digital orientation adjustment system can lock a view (e.g., initiate an editing phase) and determine a first modified orientation of a spherical panorama digital image based on a change in orientation of an inertial measurement device (e.g., both pitch and roll). The digital orientation adjustment system then generates a first modified spherical panorama digital image and unlocks the view (e.g., initiate an observation phase). The digital orientation adjustment system can then lock a second view and determine a second modified orientation of the spherical panorama digital image based on a second change in orientation of the inertial measurement device. The digital orientation adjustment system can then generate an enhanced spherical panorama digital image based on the second change in orientation.

Furthermore, the digital orientation adjustment system can also modify orientation of a spherical panorama digital image based on a change in yaw of an inertial measurement device. For example, an initial orientation of a spherical panorama digital image in a three-dimensional environment may focus on an undesirable object in an initial view. To illustrate, upon accessing a spherical panorama digital image, the orientation of the spherical panorama digital image may result in an initial view that focuses on a building wall, when the most noteworthy feature of the spherical panorama digital image is a sunset in the opposite direction of the building wall (i.e., behind the initial view). The digital orientation adjustment system can enter an observation phase and detect changes in yaw via a virtual reality device and modify the view within the three-dimensional space (e.g., detect a user turning their head while wearing the virtual reality device such that a view includes the sunset rather than the building wall). The digital orientation adjustment system can then enter editing phase (e.g., lock the view). In the editing phase, the digital orientation adjustment system modifies orientation of the spherical panorama digital image based on additional changes in yaw of the virtual reality device (e.g., detect a user turning their head to change the orientation of the spherical panorama digital image within the three-dimensional space such that the sunset is within the initial view). Thus, although the examples embodiments of FIGS. 3A-4C illustrate changes in roll and pitch, the digital orientation adjustment system can modify a spherical panorama digital image based on changes in roll, pitch, and/or yaw of an inertial measurement device.

Furthermore, although the foregoing examples discuss both an observation phase and an editing phase, it will be appreciated that the digital orientation adjustment system need not utilize two different phases. For example, in one or more embodiments, the digital orientation adjustment system may comprise only an editing phase (e.g., changes in orientation of an inertial measurement device always change orientation of a spherical panorama digital image relative to a three-dimensional space).

Moreover, in relation to embodiments that include both an observation phase and an editing phase, it will be appreciated that the digital orientation adjustment system can toggle between the observation phase and the editing phase based on a variety of factors. Indeed, as mentioned previously, the digital orientation adjustment system can switch between an observation phase and an editing phase based on user input (e.g., selection of a button or a user interface element). In addition, in one or more embodiments, the digital orientation adjustment system can toggle between an observation phase and an editing phase based on an inertial measurement device maintaining a particular orientation for a period of time. To illustrate, the digital orientation adjustment system can detect that a user modifies orientation of a virtual reality device and maintains the modified orientation for a threshold amount of time. After the threshold amount of time, the digital orientation adjustment system can automatically toggle to an editing phase.

In addition to time, the digital orientation adjustment system can also toggle between an observation phase and an editing phase based on a correspondence between an orientation of an inertial measurement device and the spherical panorama digital image. For example, the digital orientation adjustment system can identify a line segment (e.g., a horizontal line segment) in a spherical panorama digital image and determine that a user modifies orientation of an inertial measurement device to align to the line segment (i.e., align within a threshold angle to the line segment). In response, the digital orientation adjustment system can automatically toggle to the editing phase. Similarly, during editing phase, the digital orientation adjustment system can detect that an orientation of an inertial measurement device corresponds to an orientation of a three-dimensional space (e.g., the inertial measurement device aligns within a threshold angle to a horizon of the three-dimensional space). In response, the digital orientation adjustment system can automatically switch from the editing phase to an observation phase.

Furthermore, although FIGS. 3A-4C illustrate a single spherical panorama digital image, it will be appreciated that the digital orientation adjustment system can modify orientation in relation to a plurality of spherical panorama digital images based on an inertial measurement device. In particular, the digital orientation adjustment system can utilize an inertial measurement device to align two spherical panorama digital images within a three-dimensional space. For example, FIG. 5A illustrates modifying orientation of a first spherical panorama digital image to align with a second spherical panorama digital image within a three-dimensional space.

Figure 5A:
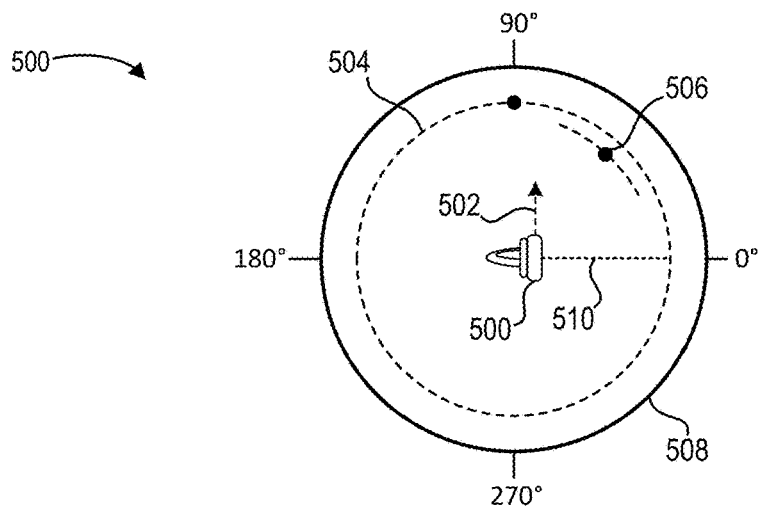
FIGS. 5A-5C illustrate a representation of modifying orientation of a second spherical panorama digital image in relation to a first spherical panorama digital image in accordance with one or more embodiments.

In particular, FIG. 5A illustrates a profile of a virtual reality device 500 at a first orientation 502. The digital orientation adjustment system generates a view 510 in a three-dimensional space 508 containing a first spherical panorama digital image 504 and a second spherical panorama digital image 506.

The first spherical panorama digital image 504 and the second spherical panorama digital image 506 can comprise any variety of spherical panorama digital images. For example, the first spherical panorama digital image 504 can comprise a 360-degree panorama digital image of a scene and the second spherical panorama digital image 506 can comprise a portion of a spherical panorama digital image (e.g., a spherical panorama digital image of a building, car, person, or other object) that a user seeks to super-impose on the first spherical panorama digital image 504. Similarly, the first spherical panorama digital image can comprise a 180- degree panorama digital image of a scene and the second spherical panorama digital image 506 can comprise another 180-degree panorama digital image of the scene that a user seeks to align together.

Regardless of the contents of the spherical panorama digital images 504, 506, the digital orientation adjustment system can modify orientation of the spherical panorama digital images 504, 506 utilizing an inertial measurement device (i.e., the virtual reality device 500). In particular, the digital orientation adjustment system can modify orientation of the second spherical panorama digital image 506 relative to the first spherical panorama digital image and/or the three-dimensional space 508 based on changes in orientation to the virtual reality device 500.

Figure 5B:
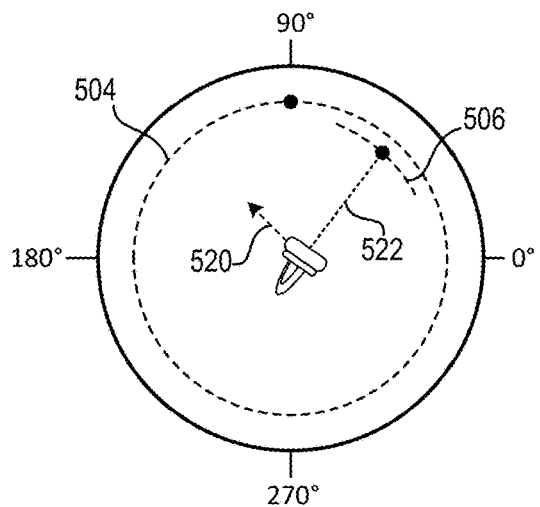

Indeed, in one or more embodiments the digital orientation adjustment system utilizes an observation phase and an editing phase in adjusting relative orientation of multiple spherical panorama digital images. For example, FIG. 5B illustrates changing a view (i.e., in an observation phase) in response to changes in orientation of an inertial measurement device. Specifically, the digital orientation adjustment system detects a second orientation 520 of the virtual reality device 500 (i.e., a user looking upward while wearing the virtual reality device 500). In response, the digital orientation adjustment system generates a second view 522. Specifically, the digital orientation adjustment system generates a second view 522 that includes the second spherical panorama digital image 506 while maintaining the orientation of the first spherical panorama digital image 504 and the second spherical panorama digital 506 relative to the three-dimensional space 508.

As mentioned, the digital orientation adjustment system can also enter an editing phase to adjust orientation of one or more of the spherical panorama digital images 504, 506. For instance, the digital orientation adjustment system can lock the view 522 in relation to the second spherical panorama digital image 506. Specifically, the digital orientation adjustment system can lock the view 522 in relation to the second spherical panorama digital image 506 such that the view 522 of the second spherical panorama digital image 506 remains fixed despite changes in orientation of the virtual reality device 500, while the orientation of the second spherical panorama digital image 506 changes relative to the first spherical panorama digital image 504 and the three-dimensional space 508 based on the changes in orientation of the virtual reality device 500.

Figure 5C:
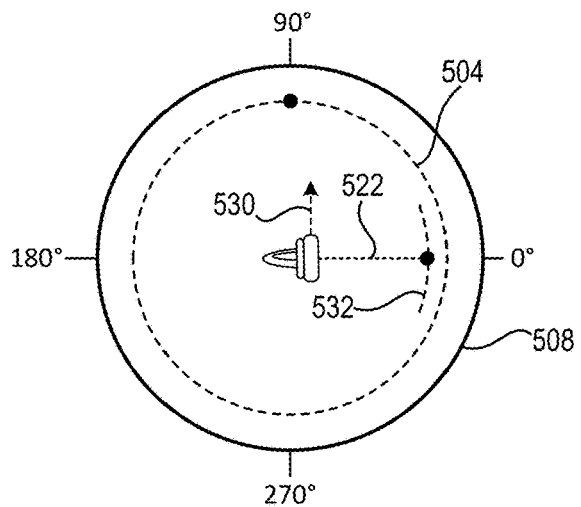

For instance, FIG. 5C illustrates a modified second spherical panorama digital image 532 based on a change in orientation of the virtual reality device 500. In particular, the digital orientation adjustment system detects (in editing phase) a change in orientation of the virtual reality device 500 to a third orientation 530. In response the digital orientation adjustment system generates the modified second spherical panorama digital image 532 by changing the orientation of the second spherical panorama digital image 506 relative to the first spherical panorama digital image 504 and the three-dimensional space 508 based on the difference between the second orientation 520 and the third orientation 530.

As shown in FIG. 5C, this process results in a modified orientation of the second spherical panorama digital image relative the first spherical panorama digital image 504 and the three-dimensional space 508. In this manner, the digital orientation adjustment system can align the second spherical panorama digital image 506 in relation to the first spherical panorama digital image 504 in any desired orientation. For example, the digital orientation adjustment system can align the second spherical panorama digital image 506 as an overlay to the first spherical panorama digital image (e.g., place a spherical panorama digital image of a car, building, or person as an overlay to a spherical panorama digital image of a particular scene). Similarly, the digital orientation adjustment system can align the second spherical panorama digital image 506 to stitch together multiple spherical panorama digital images (e.g., combine two 180-degree spherical panorama digital images of the same scene captured with different orientations to generate a single 360-degree spherical panorama digital image of the scene).

Although FIG. 5C illustrates modifying orientation of a spherical panorama digital image based on a change in pitch of the virtual reality device 500, it will be appreciated that the digital orientation adjustment system can modify orientation based on a change in pitch, a change in roll, and/or a change in yaw of the virtual reality device 500. In this manner, the digital orientation adjustment system can align multiple spherical panorama digital images relative to a three-dimensional space based on user input, even if the spherical panorama digital images are misaligned in a variety of different directions (e.g., pitch, roll and yaw).

In addition, although FIGS. 5A-5C illustrate changing orientation of the second spherical panorama digital image 506, it will be appreciated that the digital orientation adjustment system can also modify the first spherical panorama digital image 504 (i.e., separately or simultaneously with the second spherical panorama digital image). For example, in one or more embodiments, the digital orientation adjustment system selects which of a plurality of spherical panorama digital images to modify. To illustrate, the digital orientation adjustment system can select one or more spherical panorama digital images to modify based on where a user is looking via the virtual reality device 500 (i.e., based on a detected position of the virtual reality device 500).

Similarly, in one or more embodiments, the virtual reality device 500 includes a separate input device (e.g., a controller or gloves comprising an inertial measurement device). The digital orientation adjustment system can detect user selection of one or more spherical panorama digital images via the input device (e.g., a user can "grab" particular images with the gloves and the digital orientation adjustment system can detect orientation changes via the gloves).

Figure 6:
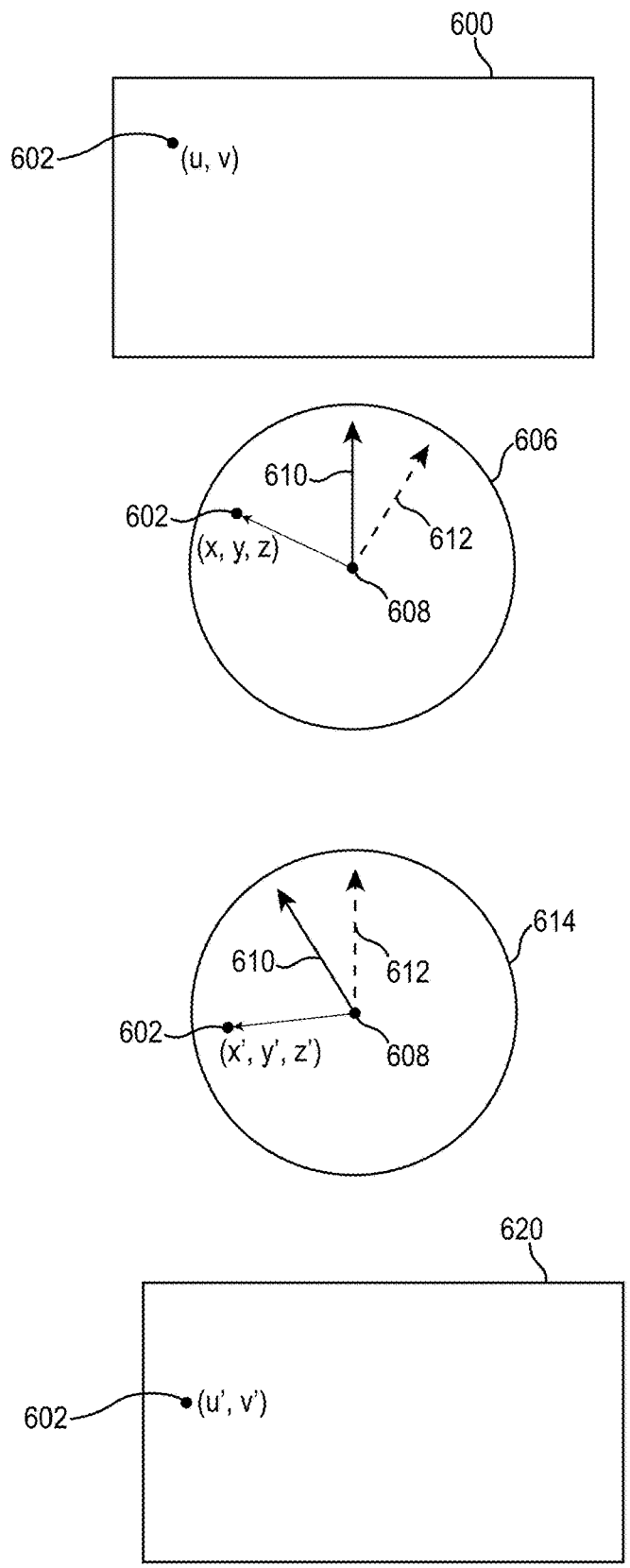
FIG. 6 illustrates modifying a pixel in a spherical panorama digital image based on a modified orientation in accordance with one or more embodiments.

Turning now to FIG. 6, additional detail will be provided regarding modifying a spherical panorama digital based on a modified orientation in accordance with one or more embodiments. Indeed, as discussed above, the digital orientation adjustment system can generate an enhanced spherical panorama digital image by re-sampling pixels at a modified orientation utilizing a rotation matrix. Furthermore, the digital orientation adjustment system can project a modified spherical panorama digital image between a two-dimensional space and a three-dimensional space to generate an enhanced spherical panorama digital image. Specifically, the digital orientation adjustment system can map pixels in a spherical panorama digital image (e.g., an image in two-dimensional space) to positions on a unit sphere, modify the positions on the unit sphere based on a modified orientation, and map the modified positions back to a two-dimensional space to generate an enhanced spherical panorama digital image.

For example, FIG. 6 illustrates generating an enhanced spherical panorama digital image in accordance with one or more embodiments. In particular, FIG. 6 illustrates a representation of an input spherical panorama digital image 600, with a pixel 602. The digital orientation adjustment system can sample the pixel 602 from a plurality of pixels making up the input spherical panorama digital image 600. As shown, the pixel 602 is located at coordinates (u, v) on the input spherical panorama digital image 600.

As shown, in FIG. 6, the digital orientation adjustment system maps the pixel 602 to a three-dimensional space. Specifically, the digital orientation adjustment system projects the pixel 602 to a sphere 606 centered on a position 608 (i.e., the position of the camera utilized to capture the spherical panorama digital image). Indeed, the digital orientation adjustment system maps the pixel 602 to a position on the sphere 606 by converting the position (u, v) to a latitude and longitude on the sphere 606. In addition, as shown, in one or more embodiments, the digital orientation adjustment system also converts the location of the pixel 602 to a three-dimensional position (x, y, z) on the sphere 606.

As illustrated in FIG. 6, the position (x, y, z) is in relation to an initial orientation 610 of the spherical panorama digital image. As shown, the digital orientation adjustment system can identify a modified orientation 612. Indeed, as discussed above, the digital orientation adjustment system can detect a modified orientation 612 based on changes in orientation to an inertial measurement device. Accordingly, in one or more embodiments, the digital orientation adjustment system rotates the sphere 606 to generate a modified sphere 614 such that the modified orientation 612 is pointed vertically. The rotation of the sphere 606 to the modified sphere 614 has the result of moving the pixel 602 from the coordinates (x, y, z) to modified coordinates (x', y', z'). In other words, the digital orientation adjustment system determines a rotation matrix between the initial orientation 610 and the modified orientation 612 and determines a modified position of the pixel 602 by applying the rotational matrix.

In addition, as shown in FIG. 6, the digital orientation adjustment system maps the modified position (x', y', z') back to a two-dimensional space to generate an enhanced spherical panorama digital image 620. In particular, in one or more embodiments, the digital orientation adjustment system converts the modified position (x', y', z') to a latitude and longitude on the modified sphere 614, and then maps the latitude to a position (u', v') on the enhanced spherical panorama digital image 620.

Generating an enhanced digital image based on a modified orientation can also be described in terms of pseudocode performed by the digital orientation adjustment system. For example, in one or more embodiments, the digital orientation adjustment system defines an algorithm, Cart2Sphe, that converts three-dimensional points from Cartesian coordinates (x, y, z) to spherical coordinates (longitude, latitude). Similarly, the digital orientation adjustment system defines an algorithm Sphe2Cart that converts spherical coordinates (longitude, latitude) to Cartesian coordinates (x, y, z).

In addition, the digital orientation adjustment system determines a rotation matrix, based on a corrected vertical pole, P, as follows (with explanatory descriptors of the steps in brackets:

[Define Input X-Axis] $X_{ori}=(1,0,0)$;
[Define New X-Axis] $X_{new}=X_{ori}-\text{dot}(X_{ori}, P)*P$;
[Define New Z-Axis] $Z_{new}=\text{cross}(X_{new}, P)$;
[Define Inverse Rotation Matrix (i.e., vertical pole to input orientation)] $M_{inv}=[X_{new}', P', Z_{new}']$, where $X_{new}'$, $P'$, and $Z_{new}'$ are the negation of $X_{new}$, P, and $Z_{new}$, respectively;
[Define Rotation Matrix (i.e., input orientation to vertical pole)] $M_{rot}=M_{inv}'$, where $M_{inv}'$ is the negation of $M_{inv}$;

Further, the digital orientation adjustment system applies the rotation matrix to each pixel in an input_image as follows:

longitude=pixel.xpos, where pixel.xpos is the x-position of a pixel in a spherical panorama digital image;
latitude=pixel.ypos, where pixel.ypos is the y-position of a pixel in a spherical panorama digital image;
(x, y, z)=Cart2Sphe(longitude, latitude);
(x', y', z')=$M_{rot}*$(x, y, z);
(longitude$_{new}$, latitude$_{new}$)=Sphe2Cart(x', y', z');
pixel.rgb=input_image(longitude$_{new}$, latitude$_{new}$).rgb, where pixel.rgb defines the new location of each pixel within an enhanced digital image.

Although FIG. 6 illustrates a single pixel 602, it will be appreciated that in one or more embodiments, the digital orientation adjustment system resamples a plurality of pixels (e.g., each pixel of the input spherical panorama digital image 600). In particular, the digital orientation adjustment system can resample each pixel in the input spherical panorama digital image 600, modify the pixel in accordance with one or more techniques described above, and generate the enhanced spherical panorama digital image 602.

Although FIG. 6 illustrates the enhanced spherical panorama digital image 620 in a two-dimensional space, it will be appreciated that the digital orientation adjustment system can also generate an enhanced spherical panorama digital image in a three-dimensional space. For instance, in displaying a spherical panorama digital image via a virtual reality device, the digital orientation adjustment system can present the spherical panorama digital image 620 in a three-dimensional space rather than a two-dimensional space.

It will be appreciated that, although FIGS. 1-6 discuss modifying orientation in relation to spherical panorama digital images, it will be appreciated that the digital orientation adjustment system can also modify spherical panorama digital movies (i.e., digital movies comprising a sequence of spherical panorama digital images). For example, utilizing methods described above, the digital orientation adjustment system can modify individual frames in a spherical panorama digital movie. To illustrate, the digital orientation adjustment system can detect a change in orientation of an inertial measurement device and modify orientation of first spherical panorama digital image in a spherical panorama digital movie based on the change in orientation.

In addition, in one or more embodiments, the digital orientation adjustment system can modify a second spherical panorama digital image in the spherical panorama digital movie based on the change in orientation. For example, the digital orientation adjustment system can apply a modified orientation from the first spherical panorama digital image to the second spherical panorama digital image. In this manner, the digital orientation adjustment system can enable a user to correct orientation changes across individual frames in a spherical panorama digital movie.

Further, in one or more embodiments, the digital orientation adjustment system modifies orientation of a spherical panorama digital movie, while also allowing a user to view the spherical panorama digital movie. For example, the digital orientation adjustment system can track changes in orientation of an inertial measurement device over time and modify orientation of the spherical panorama digital movie over time (i.e., modify individual spherical panorama digital images) based on the detected changes in orientation.

Figure 7:
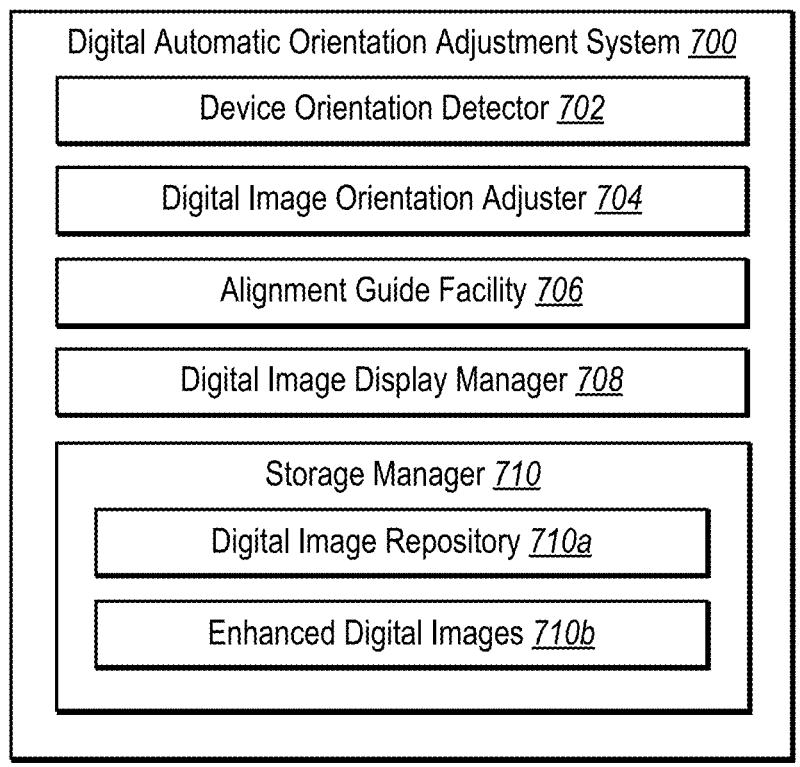
FIG. 7 illustrates a schematic diagram illustrating a digital orientation adjustment system in accordance with one or more embodiments.

Turning now to FIG. 7, additional detail is provided regarding components and capabilities of one embodiment of the digital orientation adjustment system. In particular, FIG. 7 illustrates an embodiment of an exemplary digital orientation adjustment system 700 (e.g., the digital orientation adjustment system referenced above). As shown, the digital orientation adjustment system 700 may include, but is not limited to a device orientation detector 702; a digital image orientation adjuster 704; an alignment guide facility 706; a digital image display manager 708; and a storage manager 710 (comprising a digital image repository 710a and enhanced digital images 710b).

As just mentioned, and as illustrated in FIG. 7, the digital orientation adjustment system 700 may include the device orientation detector 702. The device orientation detector 702 can identify, determine, calculate, and/or detect orientation of one or more devices. In particular, the device orientation detector 702 can operate in conjunction with one or more accelerometers, gyroscopes, and/or magnetometers to detect orientation of a virtual reality device or other inertial measurement device. The device orientation detector 702 can detect changes in roll, changes in yaw, and/or changes in pitch.

As shown in FIG. 7, the digital orientation adjustment system 700 also includes the digital image orientation adjuster 704. In particular, the digital image orientation adjuster 704 can change, modify, alter, and/or adjust spherical panorama digital images. In particular, the digital orientation adjustment system can modify orientation of a spherical panorama digital image relative to a three-dimensional space. Specifically, the digital orientation adjustment system can modify orientation of a spherical panorama digital image relative to a three-dimensional space based on a change in orientation of an inertial measurement device (e.g., a change in orientation detected by the device orientation detector 702). The digital orientation adjustment system can also project spherical panorama digital images between a two-dimensional space and a three-dimensional space.

As illustrated in FIG. 7, the digital orientation adjustment system 700 also includes the alignment guide facility 706. The alignment guide facility 706 can generate, create, calculate, and/or determine one or more alignment guides. In particular, the alignment guide facility 706 can generate an alignment guide based on a line segment (e.g., a horizontal line segment or a vertical line segment) in a spherical panorama digital image at a particular orientation. Specifically, as described above, the alignment guide facility 706 can detect a line segment, project the line segment to a three-dimensional space, extend the line segment into a great circle within the three-dimensional-space, and project the great circle to a two-dimensional space. In addition, the alignment guide facility 706 can generate an alignment guide in a three-dimensional space, as described above.

In addition to the alignment guide facility 706, the digital orientation adjustment system 700 also includes the digital image display manager 708. The digital image display manager 708 can provide spherical panorama digital images (and/or alignment guides) for display via one or more display devices. For example, the digital image display manager 708 can provide a spherical panorama digital image for display in relation to a two-dimensional space or a three-dimensional space. For example, the digital image display manager 708 can provide a spherical panorama digital image for display via a virtual reality device, a smartphone, or digital display device.

Moreover, as illustrated in FIG. 7, the digital orientation adjustment system 700 also includes the storage manager 710. The storage manager 710 maintains data to perform the functions of the digital orientation adjustment system 700. As illustrated, the storage manager 710 includes the digital image repository 710a (i.e., a repository of spherical panorama digital images) and enhanced digital images 710b (e.g., spherical panorama digital images with modified orientations).

Each of the components 702-710 of the digital orientation adjustment system 700 (as shown in FIG. 7) may be in communication with one another using any suitable communication technologies. It will be recognized that although components 702-710 of the digital orientation adjustment system 700 are shown to be separate in FIG. 7, any of components 702-710 may be combined into fewer components, such as into a single facility or module, divided into more components, or configured into different components as may serve a particular embodiment.

The components 702-710 of the digital orientation adjustment system 700 can comprise software, hardware, or both. For example, the components 702-710 can comprise one or more instructions stored on a computer-readable storage medium and executable by processors of one or more computing devices. When executed by the one or more processors, the computer-executable instructions of the digital orientation adjustment system 700 can cause a client device and/or a server device to perform the methods described herein. Alternatively, the components 702-710 and their corresponding elements can comprise hardware, such as a special purpose processing device to perform a certain function or group of functions. Additionally, the components 702-710 can comprise a combination of computer-executable instructions and hardware.

Furthermore, the components 702-710 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-710 may be implemented as a stand-alone application, such as a desktop or mobile application. Furthermore, the components 702-710 may be implemented as one or more web-based applications hosted on a remote server. The components 702-710 may also be implemented in a suit of mobile device applications or "apps." To illustrate, the components 702-710 may be implemented in an application, including but not limited to ADOBE® PHOTOSHOP® software or ADOBE® LIGHTROOM® software. "ADOBE," "PHOTOSHOP," and "LIGHTROOM" are either registered trademarks or trademarks of Adobe Systems Incorporated in the United States and/or other countries.

Figure 8:
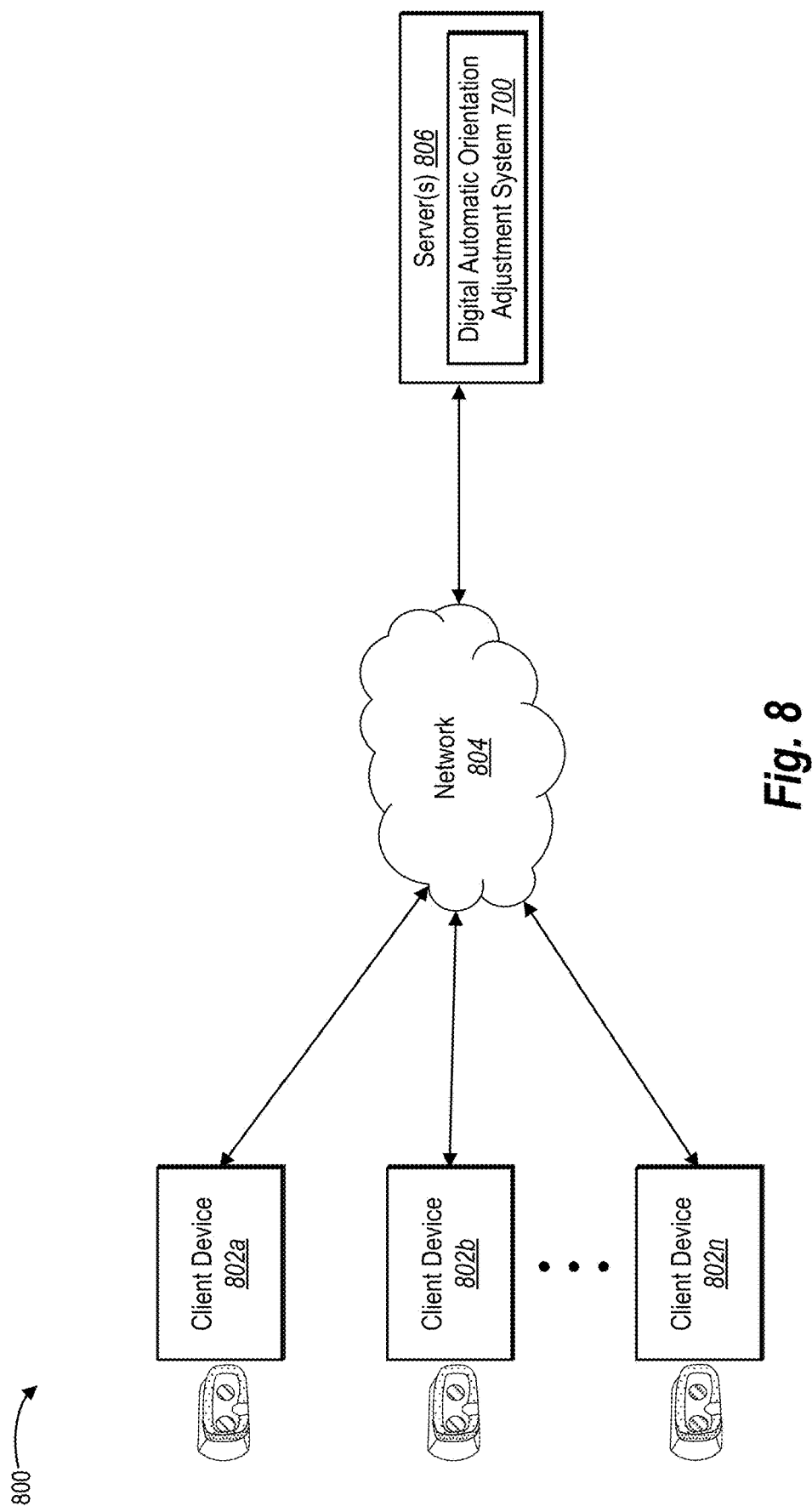
FIG. 8 illustrates a schematic diagram illustrating an exemplary environment in which the digital orientation adjustment system may be implemented in accordance with one or more embodiments.

FIG. 8 illustrates a schematic diagram of one embodiment of an exemplary environment 800 in which the digital orientation adjustment system 700 can operate. In one or more embodiments, the exemplary environment 800 includes one or more client devices 802a, 802b, . . . 802n, a network 804, and server(s) 806. The network 804 may be any suitable network over which the computing devices can communicate. Example networks are discussed in more detail below with regard to FIG. 11.

As illustrated in FIG. 8, the environment 800 may include client devices 802a-802n. The client devices 802a-802n may comprise any computing device. For instance, as illustrated the client devices 802a-802n can comprise one or more inertial measurement devices, including virtual reality devices. Furthermore, in one or more embodiments, one or more of the client devices 802a-802n comprise one or more computing devices described below in relation to FIG. 11.

In addition, the environment 800 may also include the server(s) 806. The server(s) 806 may generate, store, receive, and transmit any type of data, including the digital image repository 710a and the enhanced digital images 710b. For example, the server(s) 806 may transmit data to a client device, such as the client device 802a. The server(s) 806 can also transmit electronic messages between one or more users of the environment 800. In one example embodiment, the server(s) 806 comprise a content server. The server(s) 806 can also comprise a communication server or a web-hosting server. Additional details regarding the server(s) 806 will be discussed below with respect to FIG. 11.

As illustrated, in one or more embodiments, the server(s) 806 can include all, or a portion of, the digital orientation adjustment system 700. In particular, the digital orientation adjustment system 700 can comprise an application running on the server(s) 806 or a portion of a software application that can be downloaded from the server(s) 806. For example, the digital orientation adjustment system 700 can include a web hosting application that allows the client devices 802a-802n to interact with content hosted at the server(s) 806. To illustrate, in one or more embodiments of the exemplary environment 800, one or more client devices 802a-802n can access a webpage supported by the server(s) 806. In particular, the client device 802a can run an application to allow a user to access, view, and/or interact with a webpage or website hosted at the server(s) 806.

Although FIG. 8 illustrates a particular arrangement of the client devices 802a-802n, the network 804, and the server(s) 806, various additional arrangements are possible. For example, while FIG. 8 illustrates multiple separate client devices 802a-802n communicating with the server(s) 806 via the network 804, in one or more embodiments a single client device may communicate directly with the server(s) 806, bypassing the network 804.

Similarly, although the environment 800 of FIG. 8 is depicted as having various components, the environment 800 may have additional or alternative components. For example, the digital orientation adjustment system 700 can be implemented on a single computing device. In particular, the digital orientation adjustment system 700 may be implemented in whole by the client device 802a or the digital orientation adjustment system 700 may be implemented in whole by the server(s) 806. Alternatively, the digital orientation adjustment system 700 may be implemented across multiple devices or components (e.g., utilizing the client devices 802a-802n and the server(s) 806).

By way of example, in one or more embodiments, the client device 802a can send a request to the server(s) 806 to access a repository of spherical panorama digital images. The server(s) 806 can provide access (e.g., via the storage manager 710) to one or more spherical panorama digital images to the client device 802a. The client device 802a can provide (e.g., via the digital image display manager 708) the spherical panorama digital image for display (e.g., in a two-dimensional space and/or a three-dimensional space) and detect (e.g., via the device orientation detector 702) changes in orientation to an inertial measurement device operatively connected to the client device 802a. The client device 802a can generate a modified orientation (e.g., via the digital image orientation adjuster 704) based on the change in orientation to the inertial measurement device. Moreover, the client device 802a can generate (e.g., via the digital image orientation adjuster 704) an enhanced spherical panorama digital image (in a two-dimensional and/or three-dimensional space) and provide the enhanced spherical panorama digital image for display. Further, the client device 802a can provide the enhanced spherical panorama digital image to the server(s) 806.

Figure 9:
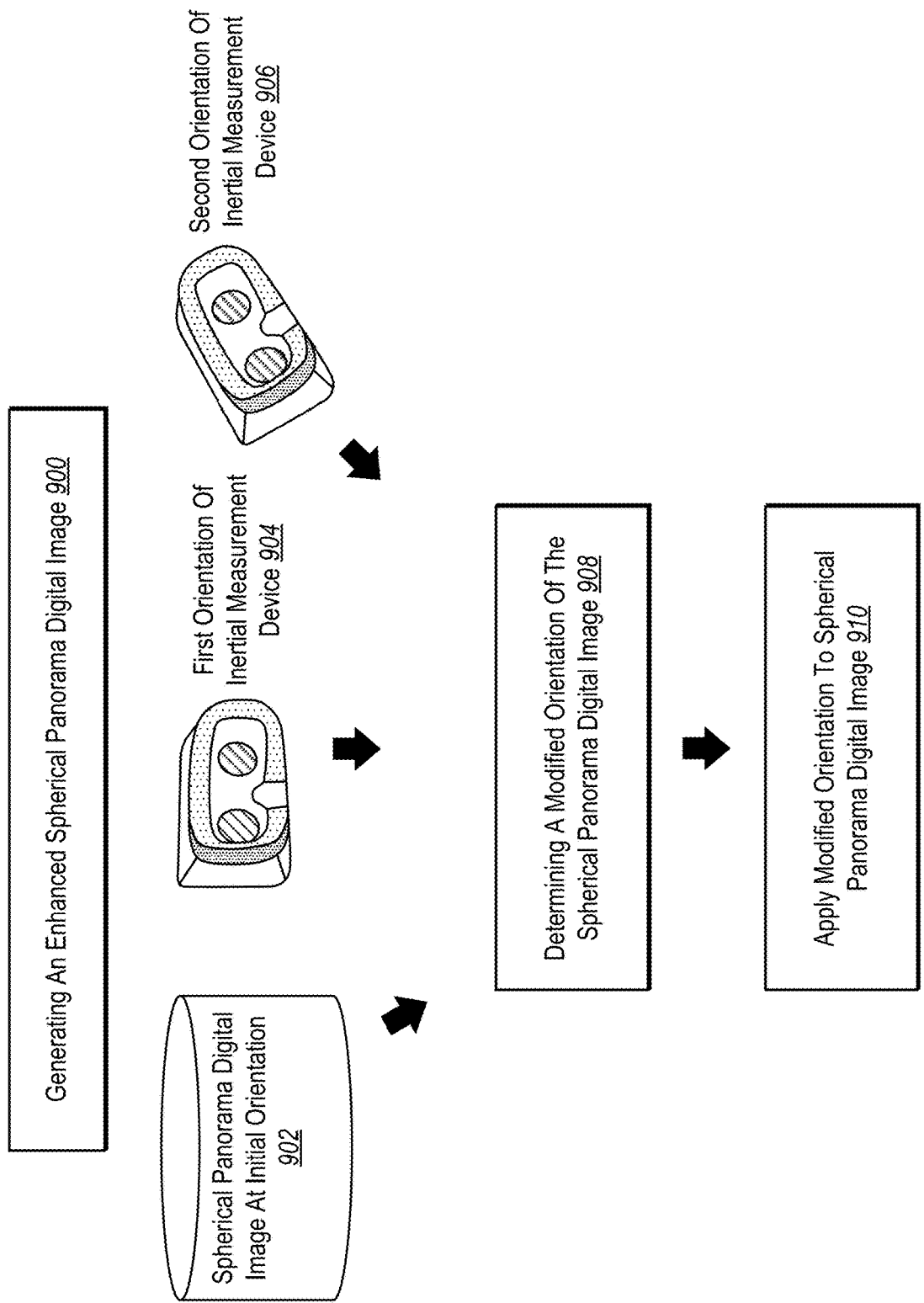
FIG. 9 illustrates a schematic diagram of acts in a step of generating an enhanced spherical panorama digital image in accordance with one or more embodiments.

Turning now to FIG. 9, additional detail will be provided regarding a step of generating an enhanced spherical panorama digital image in accordance with one or more embodiments. In particular, FIG. 9 illustrates acts utilized to perform a step 900 of generating an enhanced spherical panorama digital image in accordance with one or more embodiments.

For example, FIG. 9 illustrates that the step 900 includes the act 902 of receiving a spherical panorama digital image at an initial orientation, the act 904 of receiving a first orientation of an inertial measurement device, and an act 906 of receiving a second orientation of an inertial measurement device. To illustrate, the act 902 can comprise receiving a spherical panorama digital image from a repository of digital images (e.g., at the server(s) 806). Similarly, the act 904 can comprise receiving a first measure of roll, pitch, and yaw of a virtual reality device and the act 906 can comprise receiving a second measure of roll, pitch, and yaw of the virtual reality device (as described above in relation to FIGS. 2A-5C).

As shown in FIG. 9, the step 900 can also include the act 908 of determining a modified orientation of the spherical panorama digital image. In particular, the act 908 can comprise determining a modified orientation of the spherical panorama digital image (received at the act 902) based on the first orientation of the inertial measurement device (received at the act 904), and the second orientation of the inertial measurement device (received at the act 904). For instance, the act 908 can comprise generating a modified orientation by determining a difference between the first orientation and the second orientation.

To illustrate, if the first orientation of the inertial measurement device comprises a first measurement of roll (5 degrees), a first measurement of pitch (5 degrees), and a first measurement of yaw (5 degrees), and the second orientation of the inertial measurement device comprises a second measurement of roll (90 degrees), a second measurement of pitch (90 degrees), and a second measurement of yaw (90 degrees), the act 908 can comprise determining a difference between the first orientation and the second orientation to generate a modified orientation comprising a modified measure of roll (85 degrees), a modified measure of pitch (85 degrees), and a modified measure of yaw (85 degrees). In addition to this example, the digital orientation adjustment system can generate a modified orientation as described above in relation to FIGS. 2A-5C.

Moreover, as illustrated in FIG. 9, the step 900 can also include the act 910 of applying the modified orientation to the spherical panorama digital image. The act 910 can comprise applying a rotational matrix to the spherical panorama digital image. For example, as described in relation to FIG. 6, the act 910 can comprise calculating a rotational matrix based on the modified orientation. Moreover, as described in relation to FIG. 6, the act 910 can comprise applying the rotational matrix to each pixel of the spherical panorama digital image to generate a modified position of each pixel in the spherical panorama digital image. Accordingly, the act 910 can comprise resampling each pixel in the spherical panorama digital image based on the modified orientation to generate an enhanced spherical panorama digital image.

Figure 10:
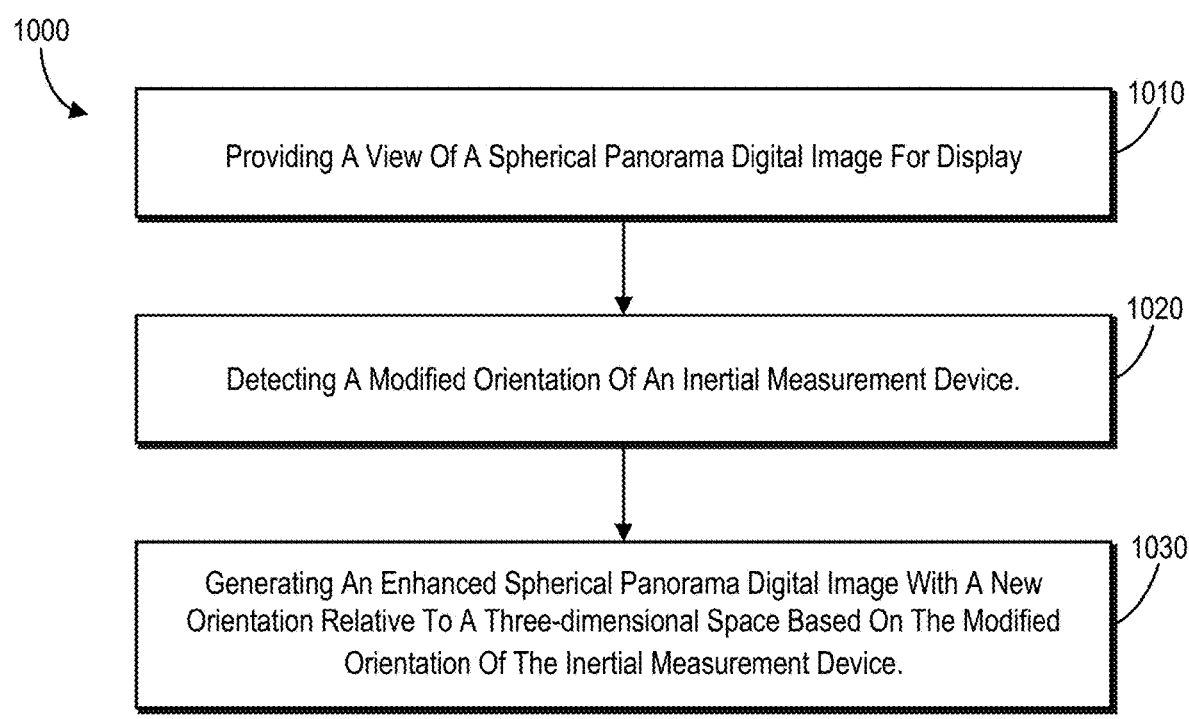
FIG. 10 illustrates a flowchart of a series of acts in a method of accounting for skew in spherical panorama digital images in accordance with one or more embodiments.

FIGS. 1-9, the corresponding text, and the examples, provide a number of different systems and devices for correcting orientation in spherical panorama digital images. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The methods described in relation to FIG. 10 may be performed with less or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of a series of acts in a method 1000 of modifying orientation in spherical panorama digital images utilizing an inertial measurement device in accordance with one or more embodiments. In one or more embodiments, the method 1000 is performed in a digital medium environment that includes the digital orientation adjustment system 700. The method 1000 is intended to be illustrative of one or more methods in accordance with the present disclosure, and is not intended to limit potential embodiments. Alternative embodiments can include additional, fewer, or different steps than those articulated in FIG. 10.

As illustrated in FIG. 10, the method 1000 includes an act 1010 of providing a view of a spherical panorama digital image for display. In particular, the act 1010 can include providing a spherical panorama digital image for display, wherein the spherical panorama digital image has an initial orientation relative to a three-dimensional space. In one or more embodiments, the act 1010 also includes generating an alignment guide corresponding to a horizon of the spherical panorama digital image by detecting a line segment in the spherical panorama digital image and projecting the line segment into the three-dimensional space according to the initial orientation. For instance, in one or more embodiments, the act 1010 comprises projecting the alignment guide from the three-dimensional space to a two-dimensional space; and providing the spherical panorama digital image for display together with the alignment guide in the two-dimensional space. Moreover, the act 1010 can also include rendering a spherical panorama digital image based on an initial orientation of an inertial measurement device and an initial orientation of the spherical panorama digital image in a three-dimensional space.

Further, the act 1010 can also comprise providing a view of the spherical panorama digital image for display in the three-dimensional space via a virtual reality device. Further, the act 1010 can also include in response to detecting an adjustment in orientation of the virtual reality device, modifying the view of the panorama digital image while maintaining the orientation of the panorama digital image relative to the three-dimensional space; and in response to user input, locking the view of the spherical panorama digital image. In one or more embodiments, the act 1010 also comprises locking the view of the spherical panorama digital image in place such that the view of the spherical panorama digital image remains fixed despite changes in orientation of the virtual reality device.

Moreover, as shown in FIG. 10, the method 1000 also includes an act 1020 of detecting a modified orientation of an inertial measurement device. In particular, the act 1020 can include detecting a change in orientation of an inertial measurement device from a first orientation. For example, in one or more embodiments, the inertial measurement device comprises a virtual reality device, and the act 1020 comprises detecting a change in roll and a change in pitch of the virtual reality device. In one or more embodiments, the act 1020 comprises, while the view of the spherical panorama digital image is locked, detecting a modified orientation of the virtual reality device.

Further, as shown in FIG. 10, the method 1000 also includes an act 1030 of generating an enhanced spherical panorama digital image with a new orientation relative to a three-dimensional space based on the modified orientation of the inertial measurement device. In particular, the act 1030 can comprise generating an enhanced spherical panorama digital image with a new orientation relative to the three-dimensional space based on the modified orientation of the virtual reality device. For example, in one or more embodiments, the act 1030 comprises detecting a final orientation of the inertial measurement device; determining the modified orientation of the enhanced spherical panorama digital image based on the initial orientation of the inertial measurement device and the final orientation of the inertial measurement device; determining a rotational matrix based on the initial orientation of the spherical panorama digital image and the modified orientation of the enhanced spherical panorama digital image; modifying pixels of the spherical panorama digital image from a first position to a second position based on the rotational matrix; and utilizing the second position of the pixel to generate the enhanced spherical panorama digital image.

In addition, in one or more embodiments, the act 1030 comprises determining a new rotation based on the modified orientation of the virtual reality device; rotating pixels of the spherical panorama digital image relative to the three-dimensional space based on the new rotation; and projecting the rotated pixels of the spherical panorama digital image from the three-dimensional space to a two-dimensional space to generate the enhanced spherical panorama digital image.

In one or more embodiments, the method 1000 also includes modifying the initial orientation of the spherical panorama digital image and the alignment guide based on the change in orientation of the inertial measurement device; and providing the spherical panorama digital image and the alignment guide for display according to the modified orientation.

Moreover, the method 1000 can also include dynamically detecting a plurality of changes in the orientation of the inertial measurement device over time; dynamically generating modified spherical panorama digital images over time based on the detected plurality of changes in the orientation of the inertial measurement device; and providing the generated modified spherical panorama digital images for display over time.

In addition, the method 1000 can also include locking a second view of the enhanced spherical panorama digital image, such that the second view of the enhanced spherical panorama digital image remains fixed despite changes in orientation of the virtual reality device; while the second view of the enhanced spherical panorama digital image is locked, detecting a second modified orientation of the virtual reality device, wherein the second modified orientation is different than the modified orientation; and generating a second enhanced spherical panorama digital image with a second new orientation relative to the three-dimensional space based on the second modified orientation of the virtual reality device.

Furthermore, in one or more embodiments, the method 1000 also includes generating an alignment guide based on the orientation of the virtual reality device; while the view is locked, modifying the alignment guide based on the modified orientation of the virtual reality device; and while the view is locked, providing for display, via the virtual reality device, the modified alignment guide together with the locked view of the spherical panorama digital image.

Moreover, the method 1000 can also include providing a second spherical panorama digital image for display via the virtual reality device in the three-dimensional space together with the spherical panorama digital image, wherein the second spherical panorama digital image has a first orientation relative to the spherical panorama digital image and the three-dimensional space; detecting a second modified orientation of the virtual device; and modifying the first orientation of the spherical panorama digital image relative to the spherical panorama digital image and the three-dimensional space to a second orientation relative to the spherical panorama digital image based on the second modified orientation of the virtual device.

The method 1000 can also include generating an alignment guide corresponding to a horizon of the spherical panorama digital image by detecting a line segment in the spherical panorama digital image and mapping the line segment to the three-dimensional space according to the initial orientation of the spherical panorama digital image; in response to detecting a change in orientation of the inertial measurement device: modifying the orientation of the spherical panorama digital image and the alignment guide based on the changed orientation of the inertial measurement device; and providing the spherical panorama digital image and the alignment guide for display according to the modified orientation. In addition, the method 1000 can also include upon detecting a final orientation of the inertial measurement device, generate an enhanced spherical panorama digital image with a new orientation based on the final orientation of the inertial measurement device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
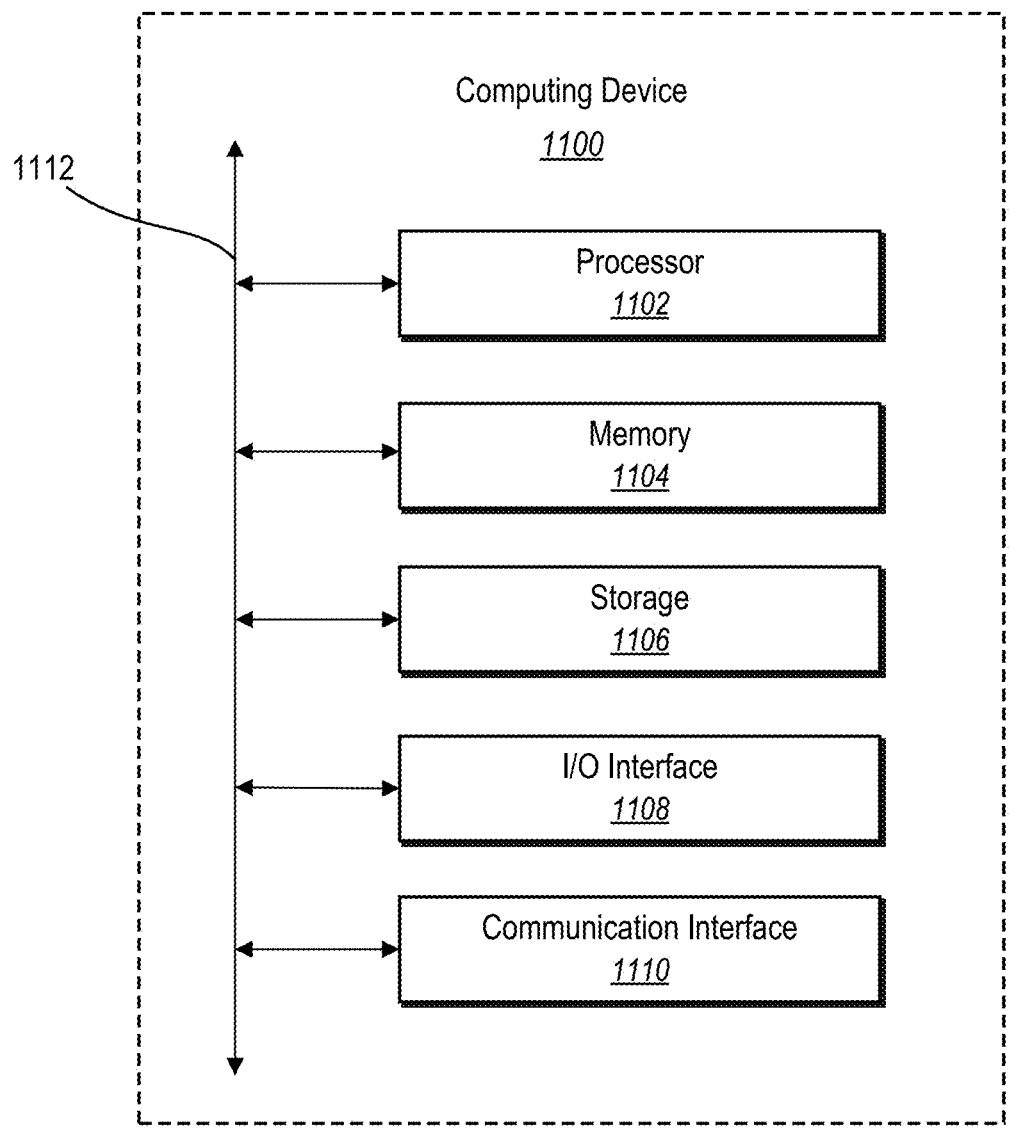
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the digital orientation adjustment system 700 can comprise implementations of the computing device 1100. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for displaying and editing digital images, a computer-implemented method of modifying alignment of panorama digital images to account for distortions comprising:
   providing a view of a spherical panorama digital image for display in a three-dimensional space via a virtual reality device, wherein the spherical panorama digital image has an orientation relative to the three-dimensional space;
   locking the view of the spherical panorama digital image in place such that the view of the spherical panorama digital image remains fixed despite changes in orientation of the virtual reality device;
   while the view of the spherical panorama digital image is locked, detecting a modified orientation of the virtual reality device; and
   generating an enhanced spherical panorama digital image with a new orientation relative to the three-dimensional space based on the modified orientation of the virtual reality device by:
      determining a new rotation based on the modified orientation of the virtual reality device;
      rotating pixels of the spherical panorama digital image relative to the three-dimensional space based on the new rotation; and
      projecting the rotated pixels of the spherical panorama digital image from the three-dimensional space to a two-dimensional space to generate the enhanced spherical panorama digital image.

2. The method of claim 1, further comprising:
in response to detecting an adjustment in orientation of the virtual reality device, modifying the view of the spherical panorama digital image while maintaining an orientation of the spherical panorama digital image relative to the three-dimensional space; and
in response to user input, locking the view of the spherical panorama digital image.

3. The method of claim 1, further comprising:
locking a second view of the enhanced spherical panorama digital image, such that the second view of the enhanced spherical panorama digital image remains fixed despite changes in orientation of the virtual reality device;
while the second view of the enhanced spherical panorama digital image is locked, detecting a second modified orientation of the virtual reality device, wherein the second modified orientation is different than the modified orientation; and
generating a second enhanced spherical panorama digital image with a second new orientation relative to the three-dimensional space based on the second modified orientation of the virtual reality device.

4. The method of claim 1, wherein detecting the modified orientation comprises detecting a change in roll and a change in pitch of the virtual reality device.

5. The method of claim 1, further comprising:
generating an alignment guide based on the orientation of the virtual reality device;
while the view is locked, modifying the alignment guide based on the modified orientation of the virtual reality device; and
while the view is locked, providing for display, via the virtual reality device, the modified alignment guide together with the locked view of the spherical panorama digital image.

6. The method of claim 1, further comprising:
providing a second spherical panorama digital image for display via the virtual reality device in the three-dimensional space together with the spherical panorama digital image, wherein the second spherical panorama digital image has a first orientation relative to the spherical panorama digital image and the three-dimensional space;
detecting a second modified orientation of the virtual reality device; and
modifying the first orientation of the spherical panorama digital image relative to the spherical panorama digital image and the three-dimensional space to a second orientation relative to the spherical panorama digital image based on the second modified orientation of the virtual reality device.

7. A system comprising:
one or more memory devices comprising a spherical panorama digital image; and
a virtual reality device configured to cause the system to:
provide a view of the spherical panorama digital image for display in a three-dimensional space via the virtual reality device, wherein the spherical panorama digital image has an orientation relative to the three-dimensional space;
generate an alignment guide based on the orientation of the virtual reality device;
lock the view of the spherical panorama digital image in place such that the view of the spherical panorama digital image remains fixed despite changes in orientation of the virtual reality device;
while the view of the spherical panorama digital image is locked:
detect a modified orientation of the virtual reality device;
modify the alignment guide based on the modified orientation of the virtual reality device; and
provide for display, via the virtual reality device, the modified alignment guide together with the locked view of the spherical panorama digital image; and
generate an enhanced spherical panorama digital image with a new orientation relative to the three-dimensional space based on the modified orientation of the virtual reality device.

8. The system of claim 7, wherein the virtual reality device is further configured to cause the system to:
in response to detecting an adjustment in orientation of the virtual reality device, modify the view of the spherical panorama digital image while maintaining an orientation of the spherical panorama digital image relative to the three-dimensional space; and
in response to user input, lock the view of the spherical panorama digital image.

9. The system of claim 7, wherein the virtual reality device is further configured to cause the system to:
lock a second view of the enhanced spherical panorama digital image, such that the second view of the enhanced spherical panorama digital image remains fixed despite changes in orientation of the virtual reality device;
while the second view of the enhanced spherical panorama digital image is locked, detect a second modified orientation of the virtual reality device, wherein the second modified orientation is different than the modified orientation; and
generate a second enhanced spherical panorama digital image with a second new orientation relative to the three-dimensional space based on the second modified orientation of the virtual reality device.

10. The system of claim 7, wherein the virtual reality device is further configured to cause the system to generate the enhanced spherical panorama digital image with the new orientation relative to the three-dimensional space based on the modified orientation of the virtual reality device by:
determining a new rotation based on the modified orientation of the virtual reality device; and
rotating pixels of the spherical panorama digital image relative to the three-dimensional space based on the new rotation.

11. The system of claim 10, wherein the virtual reality device is further configured to cause the system to project the rotated pixels of the spherical panorama digital image from the three-dimensional space to a two-dimensional space to generate the enhanced spherical panorama digital image.

12. The system of claim 7, wherein the virtual reality device is further configured to cause the system to provide a second spherical panorama digital image for display via the virtual reality device in the three-dimensional space together with the spherical panorama digital image, wherein the second spherical panorama digital image has a first orientation relative to the spherical panorama digital image and the three-dimensional space.

13. The system of claim 12, wherein the virtual reality device is further configured to cause the system to:
detect a second modified orientation of the virtual reality device; and modify the first orientation of the spherical panorama digital image relative to the spherical panorama digital image and the three-dimensional space to a second orientation relative to the spherical panorama digital image based on the second modified orientation of the virtual reality device.

14. A non-transitory computer readable medium storing instructions thereon that, when executed by at least one processor, cause a computing device to:
provide a view of a spherical panorama digital image for display in a three-dimensional space via a virtual reality device, wherein the spherical panorama digital image has an orientation relative to the three-dimensional space;
lock the view of the spherical panorama digital image in place such that the view of the spherical panorama digital image remains fixed despite changes in orientation of the virtual reality device;
while the view of the spherical panorama digital image is locked, detect a modified orientation of the virtual reality device; and
generate an enhanced spherical panorama digital image with a new orientation relative to the three-dimensional space based on the modified orientation of the virtual reality device by:
determining a new rotation based on the modified orientation of the virtual reality device;
rotating pixels of the spherical panorama digital image relative to the three-dimensional space based on the new rotation; and
projecting the rotated pixels of the spherical panorama digital image from the three-dimensional space to a two-dimensional space to generate the enhanced spherical panorama digital image.

15. The non-transitory computer readable medium of claim 14, further comprising instructions that, when executed by the at least one processor, cause the computing device to, prior to locking the view and in response to detecting an adjustment in orientation of the virtual reality device, modify the view of the spherical panorama digital image while maintaining an orientation of the spherical panorama digital image relative to the three-dimensional space.

16. The non-transitory computer readable medium of claim 15, further comprising instructions that, when executed by the at least one processor, cause the computing device to, in response to user input, lock the view of the spherical panorama digital image.

17. The non-transitory computer readable medium of claim 14, further comprising instructions that, when executed by the at least one processor, cause the computing device to:
lock a second view of the enhanced spherical panorama digital image, such that the second view of the enhanced spherical panorama digital image remains fixed despite changes in orientation of the virtual reality device;
while the second view of the enhanced spherical panorama digital image is locked, detect a second modified orientation of the virtual reality device, wherein the second modified orientation is different than the modified orientation; and
generate a second enhanced spherical panorama digital image with a second new orientation relative to the three-dimensional space based on the second modified orientation of the virtual reality device.

18. The non-transitory computer readable medium of claim 14, further comprising instructions that, when executed by the at least one processor, cause the computing device to detect the modified orientation comprises detecting a change in roll and a change in pitch of the virtual reality device.

19. The non-transitory computer readable medium of claim 14, further comprising instructions that, when executed by the at least one processor, cause the computing device to provide a second spherical panorama digital image for display via the virtual reality device in the three-dimensional space together with the spherical panorama digital image, wherein the second spherical panorama digital image has a first orientation relative to the spherical panorama digital image and the three-dimensional space.

20. The non-transitory computer readable medium of claim 19, further comprising instructions that, when executed by the at least one processor, cause the computing device to:
detect a second modified orientation of the virtual reality device; and
modify the first orientation of the spherical panorama digital image relative to the spherical panorama digital image and the three-dimensional space to a second orientation relative to the spherical panorama digital image based on the second modified orientation of the virtual reality device.

\* \* \* \* \*